United States Patent [19]

Ide

[11] Patent Number: 5,246,295
[45] Date of Patent: Sep. 21, 1993

[54] NON-CONTACTING MECHANICAL FACE SEAL OF THE GAP-TYPE

[76] Inventor: Russell D. Ide, P.O. Box 744, 641 Arnold Rd., Coventry, R.I. 02816

[21] Appl. No.: 785,005

[22] Filed: Oct. 30, 1991

[51] Int. Cl.$^5$ ............................................. F16C 17/06
[52] U.S. Cl. .................................. 384/124; 384/138; 384/139; 384/140; 384/308
[58] Field of Search ............... 384/124, 138, 139, 140, 384/306, 307, 308

[56] References Cited

U.S. PATENT DOCUMENTS

| | | |
|---|---|---|
| 2,881,014 | 4/1959 | Amirault et al. |
| 3,751,045 | 8/1973 | Lindeboom |
| 4,114,900 | 9/1978 | Wiese |
| 4,252,385 | 2/1981 | Leitzel ................................ 384/138 |
| 4,260,166 | 4/1981 | Etsion |
| 4,277,111 | 7/1981 | Gray et al. ......................... 384/124 |
| 4,632,404 | 12/1986 | Feldle et al. ....................... 384/140 |
| 4,643,437 | 2/1987 | Salant et al. |
| 4,659,092 | 4/1987 | Wallace et al. |
| 4,676,668 | 6/1987 | Ide |
| 4,738,453 | 4/1988 | Ide |
| 4,792,146 | 12/1988 | Lebeck et al. |

Primary Examiner—Lenard A. Footland
Attorney, Agent, or Firm—Michael D. Bednarek

[57] ABSTRACT

A rotary mechanical face seal for preventing leakage of a fluid, either liquid or gas, across two relatively rotating surfaces. The seal is of the non-contacting mechanical type in which a predetermined spacing is maintained between the relatively rotatable sealing washers by formation of a pressurized fluid film between the relatively rotating surfaces. The opposed faces are constructed to provide a separation of the faces at start-up and thereby prevent damage or destruction to the faces before design pressures are achieved. This is achieved by providing at least one of the opposed faces with a deflection bearing portion which causes the necessary deflections under load. The bearing portion comprises a spaced series of lift pad sections. A variety of lift pad constructions can be used. The seal also includes a hydrodynamic radial bearing which centers the shaft in the static state to avoid shaft runout.

21 Claims, 18 Drawing Sheets

NON-CONTACTING MECHANICAL FACE SEAL OF THE GAP-TYPE

FIELD OF THE INVENTION

This invention relates to a rotary mechanical gap type end face seal for sealing the space between a rotating shaft and its housing.

BACKGROUND OF THE INVENTION

Rotary mechanical gap type radial face seals are used for effecting a seal between relatively rotatable members such as a shaft and a housing by controlling leakage of the fluid from one region of high pressure to a second region of lower pressure.

Such gap type seals are typically formed with two sealing members. One of the members is fixed so that no movement occurs axially relative to the shaft, and this is referred to as a fixed seal member or, in this case, mating ring. The other element is movable axially along the shaft and is sometimes referred to as a floating element or in this particular case, the sealing ring. The elements each include sealing faces which are located in opposed relationship to each other. The sealing faces are such that, in response to fluid pressure, spring pressure, or both, a sealing relationship will be obtained between them to prevent leakage out along the shaft.

During operation the relatively rotatable sealing members are kept from touching one another during the operation of the seal. This characteristic makes them ideal for very high speeds, since there is no appreciable wear of the sealing members and hence no appreciable destructive heat produced by their relative rotation.

To keep the sealing members from touching one another under design operating conditions, a fluid pressure is created between the confronting seal faces. When this pressure exceeds the pressure (typically called spring pressure) tending to bring the seal faces together the seal faces are separated. The degree of separation is controlled by the action of the fluid as it passes between the faces to the low pressure side of the seal. At start-up of the equipment in which the seal is installed, the design fluid pressure is not available. Accordingly, the seal faces are in contact while the pressure in the seal chamber is building up to the design pressure. Such contact, even if brief, may be sufficient to create a heat and wear condition at the faces sufficient to destroy the seal.

One known gap seal is disclosed in U.S. Pat. No. 3,499,653 and U.S. Pat. No. 3,804,424 both issued to James F. Gardner. The seal disclosed in these patents is a mechanical end face seal which operates with a gap between the opposed radial sealing faces of the sealing rings to permit controlled leakage. These rings have flat, radially extending surfaces which sealingly engage one another. Shallow spiral grooves are formed in the outer periphery of one of the relatively rotatable seal members, preferably the stationary one, to create a pump, the direction of the spiral being such that the fluid to be sealed is forced between the seal members to separate and lubricate them at start-up. The spiral grooves, however, are effective in only one direction of relative rotation so that the seal is directional and may be objected to for that reason.

A similar known arrangement uses T-shaped grooves instead of spiral grooves. The function is quite similar. The grooves generate pressure to force the faces axially apart.

There are problems with known gap seal designs. For instance, the dimensions of these recesses are critical and difficult to manufacture because of the tight tolerances that are required. Also, any contaminant in the fluid has a significant detrimental effect on the performance of the seal. Accordingly, the hydrodynamic performance range is limited because of the fixed geometry in this structure.

The environment of the present invention is similar to that of then known constructions. Accordingly, reference will be had to one known construction.

Those skilled in the art will recognize the environment of gap seals used today is typically far more sophisticated than the environment described below. The following description is, however, intended simply to illustrate an example of the type of seal improved by the present invention.

FIG. 1 shows a gap seal having a rotor or mating ring 10 mounted on a shaft 11 and having a substantially radially disposed sealing surface 12 which has been appropriately lapped to be perfectly flat and smooth. The mating ring 10 is preferably made in the form of a washer which is finished and lapped independently of shaft 11 and is then assembled with respect to said shaft, in a manner so as to be rotatable therewith. Adjacent mating ring 10 and surrounding shaft 11 is a sealing washer or member 13 having a sealing surface 14 adjacent to and confronting sealing surface 12 on the mating ring 10. The sealing washer is sometimes called the sealing ring; that parlance will be adopted hereinafter. Sealing ring 13 is formed with an axially extending sleeve 15 which fits into an appropriate opening 16 in a housing 17 through which shaft 11 extends. The opening 16 is enlarged at 18 to form a seal chamber in which the mating ring 10 and sealing ring 13 may operate.

Seal chamber 18 is filled with a fluid, either a gas or a liquid, as the case may be, at any desired pressure above atmospheric. The pressure in opening 16, on the other hand, may be atmospheric pressure so that the fluid in seal chamber 18 tends to move radially inwardly between surfaces 12 and 14 and into the space between the sleeve 15 and shaft 11, to the opening 16. A seal of any suitable character, such as an O-ring 19, supports sleeve 15 and sealing ring 13 resiliently in opening 16 to allow said sealing ring to move axially in opening 16, as well as radially, to a limited extent. A very light spring 20 may be retained between sealing ring 13 and the radial wall 21 of chamber 18 to urge sealing ring 13 against mating ring 10 when there is no pressure in chamber 18.

Sometimes the sealing surface 14 is made slightly convex by a lapping operation to provide a wedge-shaped space at the radially outer regions of sealing ring 13 to initiate and maintain the separation of the surfaces 12 and 14 under operating conditions. When this is done, the actual separation at the low pressure side of surface 14 is very small so that the separation shown in FIG. 1 is greatly exaggerated for purposes of illustration. The curvature of the surface 14 is likewise considerably exaggerated.

In theory, under operating pressures, sealing ring 13 will be pushed away from surface 12 a predetermined distance and will then maintain that distance or separation regardless of axial or radial movements of the mating ring 10, the sealing ring 13 being compelled to follow such movements by the pressure effect of the fluid being sealed. This action is such that should any external forces be present tending to reduce the gap between surfaces 12 and 14, the forces of the fluid upon the movable sealing ring 13 will counter such external force and move sealing ring 13 to the right, as shown in FIG. 1, until the designed gap is created. Similarly, should the external forces be such as to tend to increase the opening between surfaces 12 and 14 above the designed opening or gap, the said forces of the fluid will urge sealing ring 13 to the left, as viewed in FIG. 1, to reduce the gap to the designed size.

Whenever the pressure of the fluid is below that for which the seal is designed to operate as a gap seal, and the sealing members are rotating relative to one another, sealing ring 13 will contact mating ring 10 and thereby establish frictional contact between surfaces 12 and 14. This contact is augmented by spring 20, the function of which is to close the gap between surfaces 12 and 14 when the equipment is not operating and thereby prevent a leakage of the fluid along shaft 12 into opening 16 and also to prevent dirt particles and other harmful substances from getting between the seal surfaces 12 and 14. Although such contact is desirable when there is no relative rotation between the mating ring 10 and sealing ring 13, it is however, highly undesirable as the relative speeds and pressures between surfaces 12 and 14 increase to the designed speeds and pressures, since even during the brief period that the equipment is getting up to speed or slowing down to stop, sufficient friction and heat can be generated to destroy the surfaces 12 and 14, particularly if the fluid sealed has low lubricating qualities such as a gas.

Undesirable friction and heat are eliminated in conventional gap seals by providing shallow spiral grooves in one of the surfaces 12 or 14. The shape of the grooves is such as to cause fluid in chamber 18 to be forced radially inwardly even at relatively slow speeds of rotation of rotor 16, across the inner regions of surfaces 12 and 14. A hydrodynamic wedge is thus created which provides sufficient pressure to separate the surfaces 12 and 14 and forms a film of the fluid being sealed on which the surface 12 rides. This, in turn, eliminates or prevents, any direct contact between surfaces 12 and 14 and prevents the generation of destructive friction and heat.

Referring to FIG. 2, the spiral grooves are shown at 22. The precise shape and size of the grooves depends largely upon degree of effectiveness required of them. In the form shown in FIG. 2, they extend spirally inward across slightly more than one-half the surface 14 and terminate at 24. They should not of course, extend across the entire surface 14 since they would then provide a leak path across the seal. The area of the grooves illustrated is a little less than one-fourth the area of said surface. The area between the grooves is indicated at 23. The groove depth, area, helix angle and the distance at which the grooves terminate may be varied to suit different operating conditions. The depth of grooves 22 is preferably two or three times the actual minimum clearance or gap between surfaces 12 and 14 when the seal is in operation.

The shallow grooves 22 may be formed in any known way. Etching is the most typical.

Since the grooves 22 are spiraled, the relative direction of rotation between the surfaces 12 and 14 must be such as to cause the fluid to be forced radially inwardly through the grooves 22. This means that the surface 12 must rotate in the same direction as the direction in which the grooves 22 are spiraled. This, in turn, limits the use of the seal to an installation in which the shaft is rotating in the direction for which the seal is designed. Such limitation, however, can be eliminated by the known constructions, which employ two or more sealing rings or by using a symmetrical groove formation as discussed below.

FIG. 3 shows an alternative groove formation known in the art. More specifically, FIG. 3 shows the surface of a ring having a series of T-shaped grooves 122 formed therein. The T-shaped grooves are symmetrically disposed across the surface of the ring. The grooves 122 function in essentially the same manner as the grooves 22 shown in FIG. 2. Specifically, grooves function to cause hydrodynamic pumping effects so as to cause separation of the opposed sealing faces. As with the spiral grooves shown in FIG. 2, the T-shaped groove should not extend across the entire ring surface. One advantage of the groove configuration shown in FIG. 3 is that it is symmetrical so that it operates in the same way regardless of the direction of rotation. Thus, this type of ring formation can be used for bi-directional sealing. Like the grooves shown in FIG. 2, the T-shaped grooves shown in FIG. 3 are extremely shallow and typically formed by etching or some other relatively sophisticated.

Another known design is shown in FIG. 4. In accordance with this design, a circumferentially spaced series of tapered lands 222 are formed along the outer periphery of one of the sealing ring and the mating ring. The land is tapered such that it gradually recedes from the surface. At the more recessed end, a step-down is formed to form a sharply recessed portion 223. Thus, with reference to FIG. 4, the land tapers from the left downward toward the right with a drop off at the recess 223. Because of the non-symmetrical nature of this tapered land, this type of groove formation is not suitable for bi-directional operation. Again, however, bi-directional operation can be provided by using two similar rings as is known in the art.

Typically tapered lands of the type shown in FIG. 4 must be provided by precision machining on the smooth face of either the sealing ring or the mating ring. It is easy to appreciate that such precise machining is difficult and expensive. In operation the ring formation shown in FIG. 4 operates in essentially the same way as the ring configuration shown in FIG. 2 and FIG. 3. In particular, the surface formation causes a pressurization of the fluid between the sealing faces causing a radial gap to form between the sealing faces.

The addition of spiral, T-shaped grooves or tapered lands provides hydrodynamic load support for the sealing ring 13. Upon the start of rotation, fluid is pumped between the faces of the seal, and at a given RPM, the hydrodynamic load support becomes sufficient to give complete separation. The seal is operable at zero pressure because of the spring force pushing the surfaces together.

It is understood that the grooves may be formed in surface 12 of mating ring 10 in FIG. 1, instead of in the confronting surface on the sealing ring 13. It is also understood that the curvature, if desired, may be formed on the surface or surfaces of the mating ring with the grooved sealing ring having a flat surface. It is also possible to eliminate the curvature especially if, as with the present invention, another way of achieving the desired effect is provided.

The present invention is intended to replace known designs in which the surface of the mating ring is etched to create surface grooves which create gas dynamic effects. In these known designs, the groove is very shallow—on the order of millionths of an inch deep. Typically, the grooves are formed by a photoetch process which is complicated and expensive. Moreover, even with these extremely shallow grooves, there is a step at the transition between the groove and the surface in which the groove is formed. This step tends to create non-laminar flow of the sealing fluid. It is known that the best sealing effects are achieved when the laminar flow of the sealing fluid is maintained.

There remains a need in the art to have a controllable mechanical seal where the thickness of the lubricating fluid film can be maintained at a practical thickness and one in which the manufacturing tolerances are reduced. It is further desirable to have a seal arrangement where contaminants are less likely to impact upon the performance of the seal, and, one in which the seal can self adjust for any shaft misalignment. Further, it is desirable to have a seal which will operate over a broader range and reduce any ultimate seal wear by obtaining an optimum film thickness over a wide range of operating conditions.

One improved mechanical face seal is disclosed in the present inventor's previous U.S. Pat. No. 4,738,453. In that patent, a controllable mechanical seal was disclosed for a machine having a housing and a shaft that is rotatable relative to the housing. The seal includes a stationary cylindrical seat member and a rotatable cylindrical nose piece. The nose piece is fitted with a plurality of lift pads that are held by the nose piece and the nose piece is also fitted with a fluid dam which defines a radial face surface. One or the other of the parts, either the seat, that is, or the nose piece will be rotatable with the shaft and suitable means will bias one element toward the other. The lift pads are particularly formed as stool like units, having flexible leg ligaments that extend at an angle to the pad face, so that the pad face may move in up to three degrees of freedom to form a fluid film between the pad face and the seat member to adjust for shaft misalignment and to provide equal loading among the lift pads. Equal loading among pads in the longitudinal shaft axis direction is provided by dog leg type bends in the ligament construction.

In any mechanical face seal, it is important that the two rings, the mating ring and the sealing ring are aligned such that their faces are in flush contact. Often, this is done by making one of the rings floating and spring biasing the two rings together so that the two rings are pressed into flush contact by the springs.

Many known designs employ complicated expensive alignment, mechanisms or arrangements. There is still a need for a simple inexpensive way to align the sealing faces relative to one another. There is also a need for a more simple spring biasing construction.

In any gap seal the sealing ring and the mating ring must rotate about concentric axes to ensure proper performance. Since the mating ring typically rotates with the shaft and the sealing ring is secured in the housing, the shaft must be supported for rotation about a fixed axis in the housing in order for the gap seal assembly to function properly. In other words, the eccentricity of the shaft must be minimized to avoid shaft runout.

In the past this has meant that ball bearings must be used to support the shaft for rotation about a fixed axis.

Ball bearings are far from ideal. They tend to wear rapidly at high speeds and are expensive for that reason. Conventional hydrodynamic bearings cannot be used, however, because the shaft position is not fixed until the shaft reaches design speed. The eccentricity of the shaft during the start-up would lead to undesirable movement of the sealing faces which would defeat the gap seal. There remains a need for a durable inexpensive bearing for supporting the shaft in a gap seal assembly for rotation about a fixed axis.

SUMMARY OF THE INVENTION

The present invention is directed to an improved mechanical face seal capable of achieving improved hydrodynamic sealing effects with a construction which is easier to manufacture than conventional etched or tapered land mechanical seal constructions. The gap-type rotary mechanical seal assembly includes a housing, a shaft, and relatively rotatable sealing members having substantially radially disposed confronting sealing faces. One of the sealing members is secured to the shaft for rotation therewith and the other sealing member is supported in the housing. One of the sealing members is axially movable relative to the other member. At least one of the sealing members includes a ring having a bearing portion and a sealing portion. The bearing portion includes a plurality of spaced pad sections. Each pad section has a shape and support structure such that under load the sealing surface of the pad deflects to form a hydrodynamic wedge. At least one of the sealing member is supported on a support structure for movement with six degrees of freedom.

The assembly also includes a hydrodynamic bearing for supporting the shaft in the housing. The hydrodynamic bearing includes a plurality of spaced bearing pads. Each bearing pad is supported by a support structure. At least one of the bearing pads is supported such that under static load the bearing pad deflects such that the trailing edge contacts the shaft so as to maintain the shaft in a centered position.

One aspect of the present invention is the provision of an improved mating ring or seal ring. The improved ring is designed by treating the ring as if it includes both a continuous smooth sealing portion and a bearing portion. The bearing portion is constructed in accordance with the deflecting pad bearing principles developed by the present inventor so as to cause a hydrodynamic effect under load which causes separation of the sealing ring and mating ring to achieve the necessary mechanical seal. Generally, the sealing section of the ring is smooth and has a solid support. The bearing section, on the other hand, is designed to deflect under load to create the necessary hydrodynamic effect because of the slight separation between the sealing ring and the mating ring necessary for proper mechanical hydrodynamic sealing. In some cases, the improved ring is formed by undercutting the backside of the mating ring or sealing ring to cause deflection under load at the sealing face to create hydrodynamic pressurization of the fluid. The present inventor has discovered that appropriate depressions or pockets on the sealing face under load can be provided by modifying the backside of either the sealing ring or the mating ring or by providing lift pads with a shape or support structure. These modifications are on a much larger scale than the micro-fine surface formations necessary in accordance with known designs. In this way, the manufacturing cost of the seal is dramatically reduced because there is no need to be as precise. The seal may be constructed either bidirectionally or unidirectionally.

As noted above, one alternative is to provide the bearing section with the necessary support by simply undercutting a continuous surface to achieve the desired deflections under load. The bearing section may also be divided into separate segments each of which is connected to the continuous sealing section by a thin ligament. The necessary deflection to obtain a hydrodynamic face is obtained by designing the pad shape or support structure in connection with the teachings of the present inventor's previous applications. In this regard, applicant incorporates by reference the teachings of his prior application Ser. No. 07/685,148 filed Apr. 15, 1991 entitled "Hydrodynamic Bearings Having Spaced Bearing pads and Methods of Making Same".

In accordance with the present invention, the necessary recesses on the sealing face can be provided by undercutting the sealing face rather than forming recesses directly on the sealing face. Finite element analysis as shown at the portions of the sealing face which undercut tend to deflect under load to form shallow recesses or pockets. Through proper location of the undercuts the recesses formed by deflection can operate in the same manner as the recesses formed directly on the sealing face to provide a hydrodynamic sealing effect known in the prior art. The precise location for any specific application is determined by a finite element analysis.

In accordance with the present invention, the hydrodynamic wedge is formed by deflection. As a result, the recesses tend to have a gradually tapered shape so that laminar flow across the sealing face is maintained. This enhances the hydrodynamic sealing effect.

Another advantage of the present invention is that the necessary undercuts or pad shape or support structure are relatively easy to manufacture into the sealing ring. In fact, in accordance with one important aspect of the invention, the sealing or mating ring may be in the form of a thin piece of plastic which can be manufactured by injection molding or some other low cost process which is much less expensive than the photoetching or precision machining required in known designs in which the recesses are formed directly on the sealing face. The plastic disk can be on the order of 0.1 inches thick. For example, with a plastic disk of about 0.1 inches thick a groove formed in the backside to a depth of about 0.03 inches thick yields deflections of about 0.0002 inches deep on the front side of the plastic disk when loaded in the case of an oil type seal. The deflection will be smaller in a gas type seal and therefore will require deeper undercuts. Of course, other materials can be used for the disks, such as bronze, silicon carbide and the like.

In accordance with another aspect of the present invention, one of the rings may be supported on a beam like support so that the ring can adjust its orientation so as to move into flush contact with the other ring. In this way, the ring has a self-aligning capability. Moreover, the beam-like support can be constructed to provide the necessary spring force to bias the sealing ring and mating ring into contact.

Another aspect of the present invention is the provision of a hydrodynamic bearing which can be used in a mechanical gap seal. This bearing, unlike conventional hydrodynamic bearings, is designed to hold the shaft in position during start-up so that the mating ring and seal ring always rotate about concentric axis. This is done by using deflection pad bearings of the type described in the applicant's previous application Ser. No. 07/685,148 filed Apr. 15, 1991 and incorporated above by reference. These deflection pad bearings are of a special type designed such that the trailing edges of the pads contact the shaft when the shaft is at rest. In this way, the pads center the shaft at rest and minimize shaft runout.

A particular support structure is needed to ensure both proper support under load and trailing edge contact at rest. Specifically, the moment generated by the load acting at the trailing edge must act to turn the pad away from the shaft. A bearing designed in this way satisfies the need for a simple inexpensive bearing which can be used to support a shaft in a gap seal assembly.

By providing a bearing which can be used with a mechanical seal, it is possible to replace ball bearings conventionally used in connection with mechanical face seals. This allows operation at higher speeds than is possible with ball bearings and increases the durability of the mechanical face seal assembly. The bearing configuration disclosed herein can be used with any face seal assembly as a replacement for ball bearings conventionally used.

Another feature of the present invention is the possibility of a self-aligning construction which one of the rings automatically aligns itself relative to the other ring to ensure that the opposed sealing faces are parallel to one another. The invention also provides for the possibility of a self biased sealing ring in which a spring function is built into the sealing ring to eliminate a separate spring or assist a separate spring.

DETAILED DESCRIPTION OF THE DRAWINGS

It is accepted that gap type seals of the type described in connection with FIGS. 1-4 provide good performance characteristics. The main drawback with these designs is their cost and the difficulty of manufacturing and susceptibility to damage caused by wear.

The present invention begins with the proposition that it is desirable in a mechanical sealing arrangement to provide surface formations such as wedges, grooves or recesses on the front side of either the mating ring or the sealing ring so as to provide a hydrodynamic sealing effect. The present inventor has found that it is better to provide these grooves or recesses through deflection under load than by physically providing grooves on the front surface. For instance, relatively deep grooves formed in the backside yield the desired small deflections or recesses or grooves on the front side without the difficulty of manufacturing very small grooves on the front side.

Another advantage is that the grooves on the front side resulting from deep grooves on the backside have a smooth sloping transition—there is no step like transition as when grooves are formed directly on the surface. A step-like transition as in prior known constructions reduces the hydrodynamic effect. Thus, it is desirable, as in the present invention, to maintain laminar flow through the pressure build up.

As noted above, the present invention is directed, in part, to an improved design of one of the two rings in a mechanical seal. In accordance with the present invention the improved ring can be designed as an insert to be carried on either the mating ring 10 or sealing ring 13. The advantage of using an insert type ring is that the ring can be manufactured out of a different material than the ring on which it is supported. This makes it possible, for example, to use rings formed of low cost high performance engineering plastics which can be formed to specification at a fraction of the cost of machining or etching metal on silicon carbide.

Figure 1:
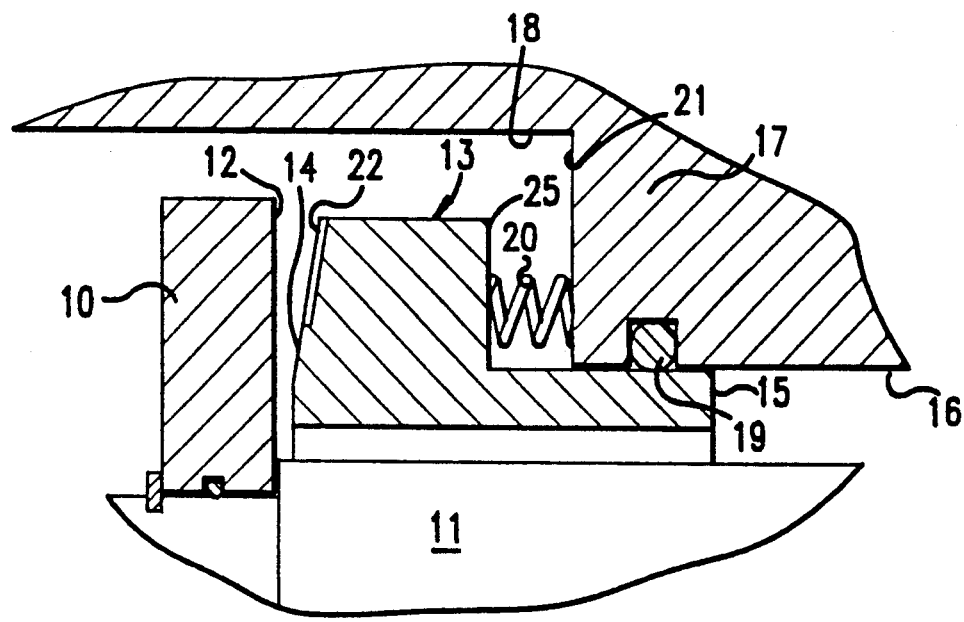
FIG. 1 is a fragmentary radial cross-section through a known gap seal.
Figure 2:
FIG. 2 is a fragmentary front elevational view of a one known sealing member which can be used with a gap type seal of the type shown in FIG. 1 showing the spiral grooves therein.
Figure 3:
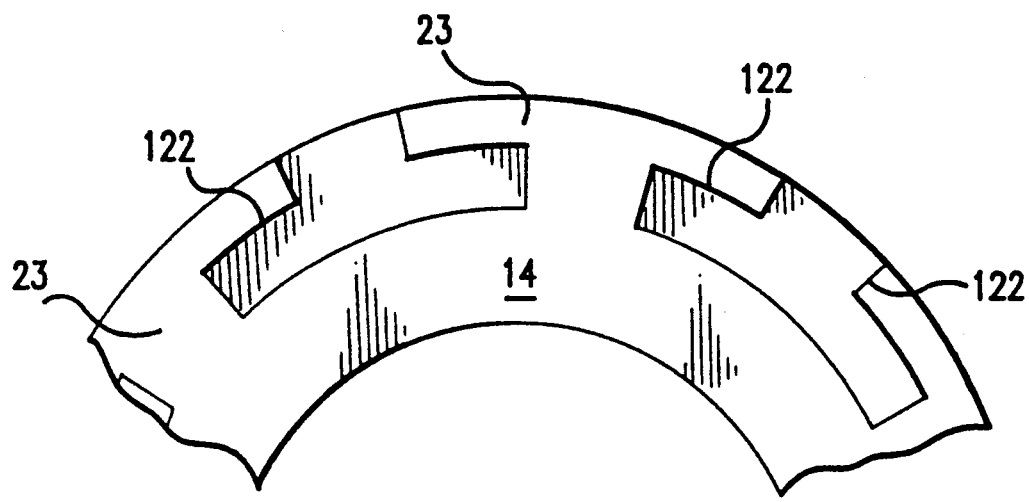
FIG. 3 is a fragmentary front elevational view of another known sealing member which can be used with a gap type seal of the type shown in FIG. 1 showing the T-shaped grooves formed therein.
Figure 4:
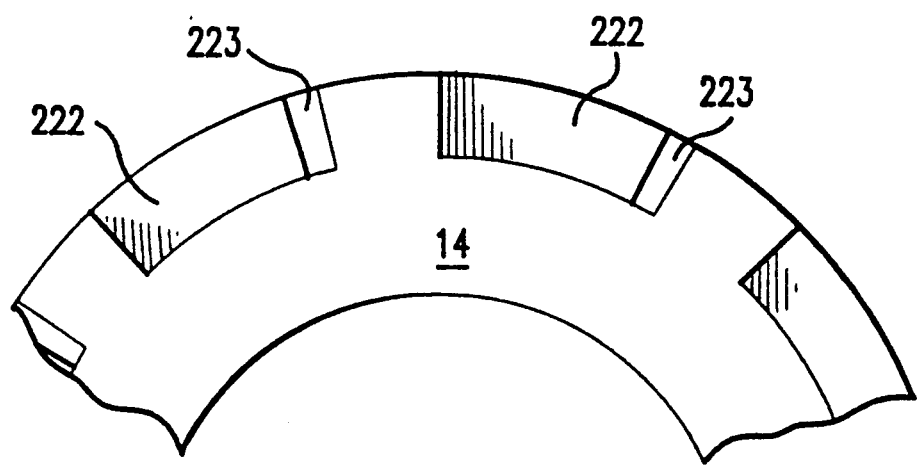
FIG. 4 is a fragmentary front elevational view of another known sealing member which can be used with a gap type seal of the type shown in FIG. 1 showing the tapered lands formed therein.
Figure 5:
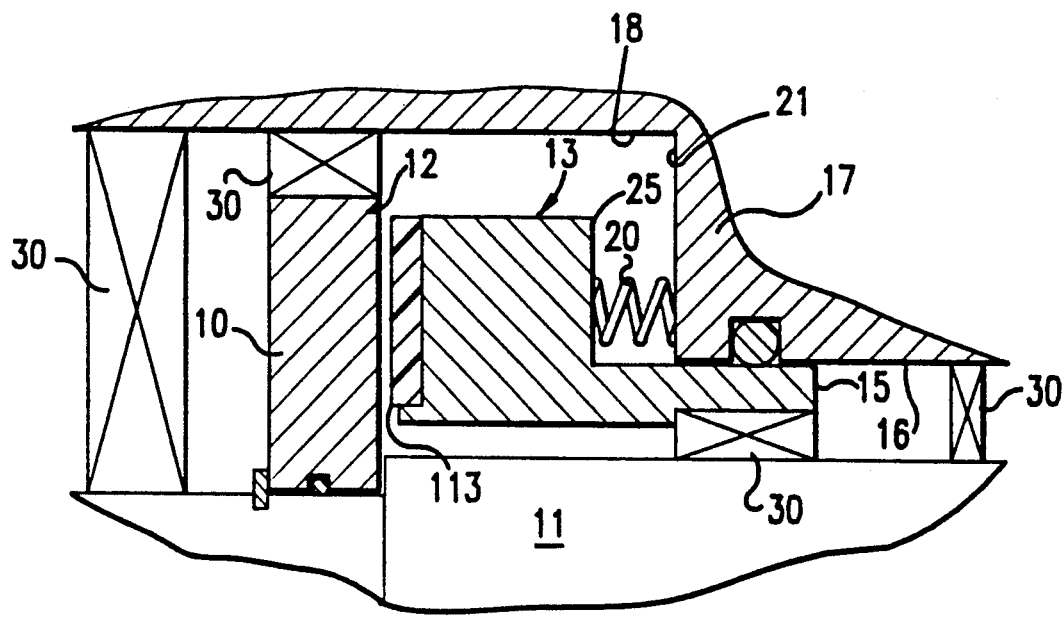
FIG. 5 is a simplified fragmentary radial cross-section showing a gap seal which includes a sealing member according to the present invention.

FIG. 5 shows generally how a seal ring 13 can be designed to act as a support for carrying a separate seal ring 113. According to the present invention the seal ring 113 can be secured to the seal ring 13 in any known manner including mechanical interconnection such as splines, threads, axial pins and/or by adhesion or by welding. The assembly shown in FIG. 5 is generally similar to the known assembly shown in FIG. 1. Identical reference numerals are used for similar components. The spring 20 for the assembly of the present invention is, however, indicated schematically. This is because the spring may be a separate spring as in the prior art or it may be built into the seal ring support structure as described below.

At this point it should be noted that a variety of supports are contemplated for the seal rings of the present invention. These include unitary supports and deflecting supports. These various supports are discussed below. Before discussing the various supports, however, the principles of the sealing ring of the present invention will be discussed. It should be understood that although specific reference is made to a sealing ring, the ring constructions of the present invention can be applied to the mating ring as well.

FIG. 5 also schematically depicts several possible locations for bearings 30 to support the shaft 11. The bearings are preferably hydrodynamic bearings according to the present invention, but conventional bearings could be used. The bearings 30 may be located at any of the positions shown or any combination or some other convenient location. If the bearings 30 are in contact with the seal components 10 and 13 as shown, then it is possible to manufacture and sell the seal and bearings as a unit. It is even possible to manufacture the components 10 or 13 as one piece with the bearings 30.

Figure 6:
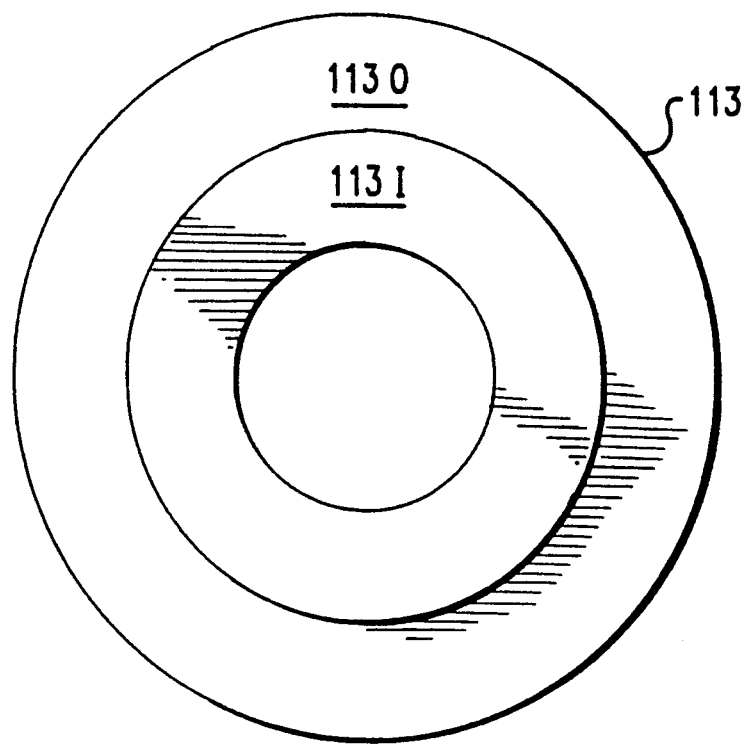
FIG. 6 is a view of the top surface of a sealing member schematically showing the two sections of the sealing members of the present invention.

FIG. 6 shows schematically, the principle of the improved ring of the present invention. Specifically, the ring is divided into concentric portions 113I and 113O. One of these portions is designed to operate as a sealing portion and the other portion is designed to operate as a bearing portion. The sealing portion is similar to a conventional sealing ring; it is continuous and has a rigid support. The surface of the sealing portion is preferably smooth and flat. The bearing portion comprises a series of circumferentially spaced sections which are shaped and/or supported by a support structure for deflection to achieve hydrodynamic effects under load.

The relative arrangement of the sealing portion and the bearing portion depends on the specific application. Thus, in some cases the bearing portion will be located in the radially outer portion 113O of the ring 113. In other cases, the sealing portion will be in the radially outer location 113O and the bearing portion will be in the radially inner location.

One advantage of locating the bearing portion outside the sealing portion is that such an arrangement maximizes the radial distance of the pads from the center of the ring—this increases the surface velocity of the pads and improves film characteristics. Another factor to consider in determining whether to locate the bearing portion inside or outside of the sealing portion is the effect of centrifugal forces on the fluid being sealed. In most known constructions the grooved section is provided radially outward of the non-grooved or sealing section. This suggests that the bearing section should be located outside the sealing section, i.e., in outer portion 113O. On the other hand, in the inventor's previous design, the lift pads are located inside the fluid dam. This suggests that the bearing portion should be located inside the sealing portion, i.e., in inner portion 113I.

Regardless of the relative position of the sealing portion and the bearing portion, the ring design of the present invention is flexible. The designs described below will show one arrangement or the other.

It should be noted that when the sealing portion is shown as the radially outer portion 113O and the bearing portion is shown as a radially inner portion 113I, it is possible to have the reverse arrangement, i.e., the bearing portion may be the radially outer portion 113O and the sealing portion may be the radially inner portion 113I.

The present invention involves shaping or supporting discrete segments or sections of the bearing portion so as to cause deflection of the surface of the bearing portion under load to create a hydrodynamic pressurization of fluid which causes separation of the adjacent rings, the mating ring 10 and the sealing ring 113 at the sealing face 12, 14 whereby the mechanical seal is created.

There are, of course, many different ways to shape or support the surface of the bearing portion to create a hydrodynamic effect.

In accordance with a first illustrative embodiment of the present invention, the bearing portion is provided with circumferentially spaced undercuts so that the continuous surface of the bearing portion has variations in stiffness across its surface such that under load, the pockets or recesses are formed in those portions of the bearing portions which are undercut.

Figure 7A:
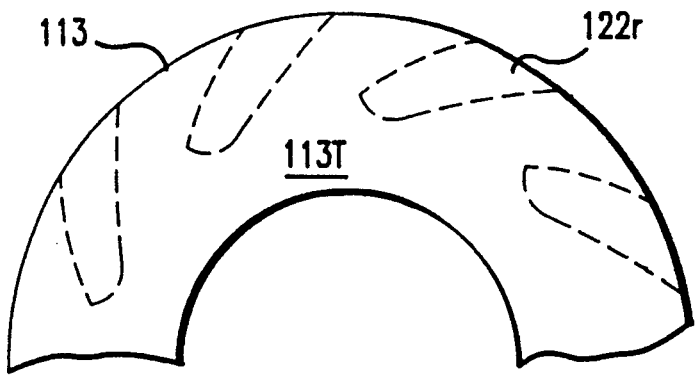
FIG. 7A is a fragmentary front or top elevational view of a sealing member according to the present invention.

FIGS. 7A-7D illustrate a first seal ring construction in which circumferentially spaced undercuts are provided to achieve the desired surface formations on the top surface of the seal ring under load. In particular, FIG. 7A shows a section of the top surface 113T of a seal ring 13 according to the present invention. As shown therein, the top surface 113T of the seal ring 113 is completely flat. In order to operate as a spiral type seal ring, however, it is desired that under load spiral type recesses be formed on the top surface of the seal ring 113 in the positions generally indicated in phantom at 122r. If such recesses are provided under load, the seal ring will operate in much the same way as a seal ring having grooves formed on the top surface by machining or etching. In accordance with the present invention, these desirable surface formations are formed not by machining directly under the top surface as in the prior art, but instead, by providing appropriate undercuts in the bottom surface 113B of the ring 113.

Figure 7B:
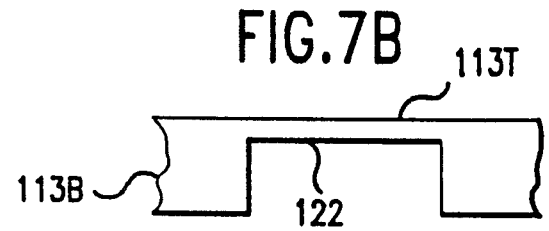
FIG. 7B is a fragmentary cross-section schematically showing a portion of the sealing member of FIG. 7A in the static unloaded state.
Figure 7C:
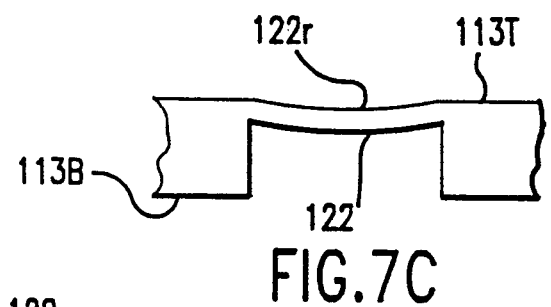
FIG. 7C is a fragmentary cross-section schematically showing a portion of the sealing member of FIG. 7A in the loaded state.
Figure 7D:
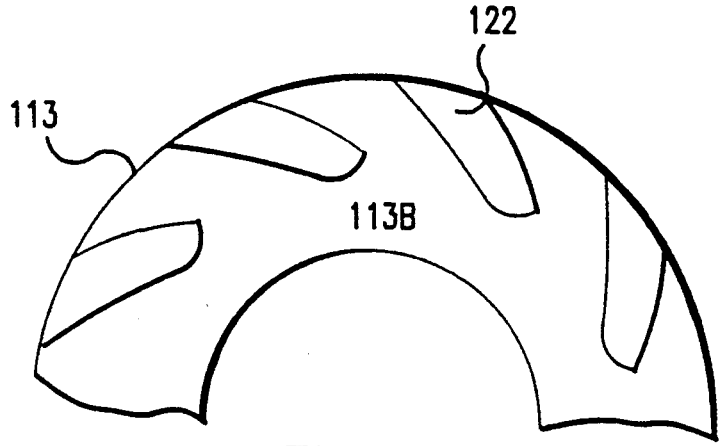
FIG. 7D is fragmentary back or bottom elevational view of the sealing member of FIG. 7A.

The controlling principles here can be best understood with reference to FIGS. 7B and 7C. FIG. 7B shows somewhat schematically a portion of the seal ring 113. As shown therein, the top surface 113T is smooth and flat in an unloaded or static situation. The bottom surface 113B is, however, provided with a groove 122 which extends into the ring 113 to undercut a portion of the top surface 113T of the ring 113.

FIG. 7C schematically illustrates the deflection of the top surface 113T when the top surface is subjected to a load such as by a fluid pressure at start-up of rotation of the seal ring. As shown therein, a portion of the top surface 113T which is undercut by the groove 122 tends to deflect downward to provide a recess 122r. Moreover, the recess 122 follows the general contour of the undercut 122.

Another important advantage of the present invention is that the recess has a gradual taper to it so that there is no sharp step or drop. This increases the likelihood of laminar flow across the top surface 113T. Thus, it can be seen that the desired recesses shown in FIG. 7A at 122r can be formed under load by providing undercuts in the fashion illustrated at 122 in FIG. 7D.

It should be appreciated that it is much easier to provide the relatively deep grooves 122 in the bottom surface 113B of the seal ring that it is to provide extremely fine grooves in the top surface 113T of the seal ring which generally must be perfectly smooth.

Figure 8A:
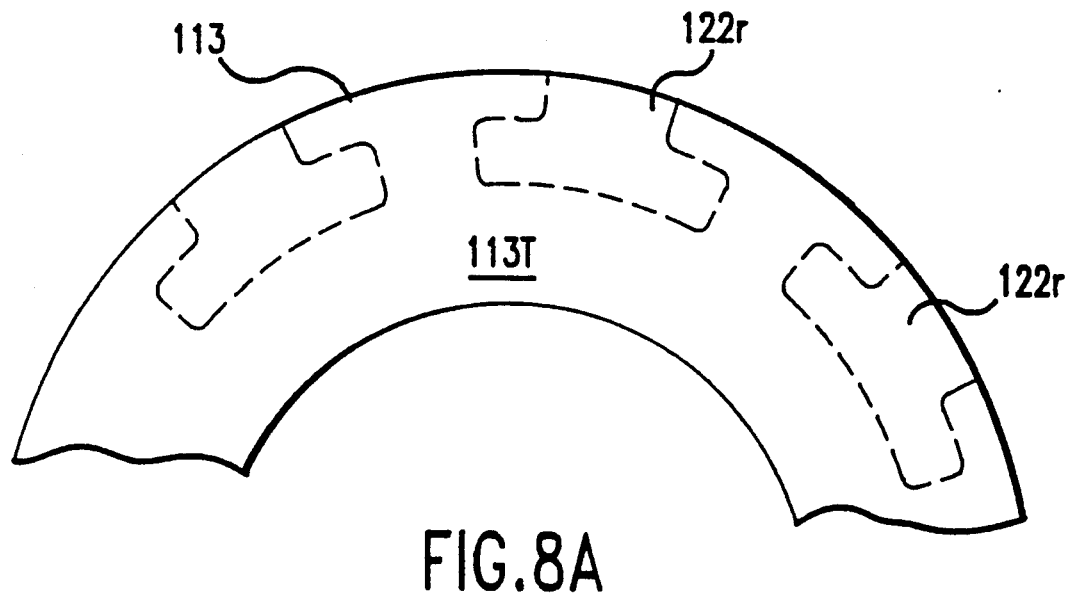
FIG. 8A is a fragmentary front or top elevational view of a sealing member according to the present invention.
Figure 8B:
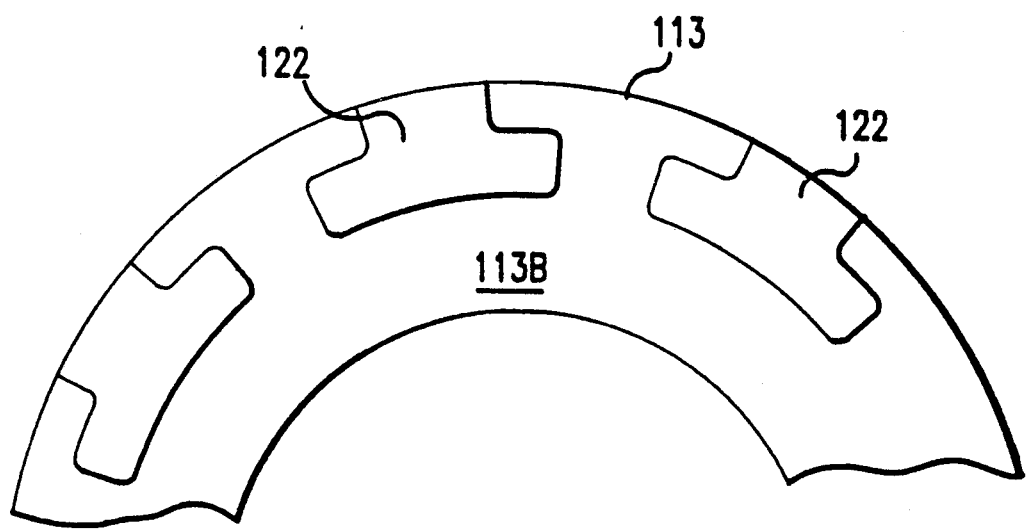
FIG. 8B is a fragmentary back or bottom elevational view of the sealing member of FIG. 8A.

FIGS. 8A and 8B illustrate another embodiment of the present invention. In this embodiment, the seal ring 113 is once again smooth and flat on the top surface 113T as shown in FIG. 8A. In this case, however, it is desired to form a cirfumferentially spaced series of T-shaped depressions on the top surface 113T under load. The desired depressions are again indicated in phantom at 122r. In order to provide the depressions 122r desired, the bottom surface 113B of the seal ring is undercut in the manner shown in FIG. 8A. The contour of the undercuts as shown at 122. In the same manner as described above, provision of the undercuts 122 causes deflection of the top surface 113T under load.

Once again, the construction of the present invention offers numerous advantages to machining or etching the recesses directly on the top surface. Among these is the relative ease of providing deep grooves in the back surfaces opposed to the difficulty of providing micro-fine grooves on the top surface. Moreover, the transition between the recesses and the non-recessed portions of the top surface 113T is much more smooth when the recesses are achieved through deflection by undercutting the top surface.

In accordance with another construction according to the present invention, the bearing section may be shaped and/or provided with a support structure which essentially divides the bearing section into a circumferentially spaced series of discrete bearing or lift pad portions which are connected to the sealing portion. The lift pads are shaped and/or supported so as to cause hydrodynamic deflection under load. The lift pads essentially operate so that the friction forces which are developed will tend to rock the pad so that the leading edge of the pad face will move away from the mating ring upon rotation of the shaft. A wedge of fluid will develop between the mating ring and the pad face of the pad. Further, by providing an appropriate support structure as discussed below, the pads may also move to compensate for shaft misalignment and equalize loading among pads.

The most important consideration in the design of lift pads is the shape of the space, typically a converging wedge, between the lift pad and the surface it opposes. Since the shape of the surface the lift pad opposes is basically invariable, it follows that the most important consideration in the design of hydrodynamic lift pads is the shape of the pad surface under load. The shape of the pad surface under load principally depends upon two factors: the shape of the pad itself and the construction and location of the pad support structure.

For purposes of this description, the various pad designs will be discussed first followed by a discussion of various support structure designs. It must be emphasized that the various support structures disclosed herein can be used with any of the pad shapes disclosed herein and the pad-shapes used herein can be used with any of the support structures disclosed herein.

The pads and support structure are designed to optimize the shape of the converging wedge formed between the pad surface and the shaft when the shaft rotates. As detailed in applicant's pending application Ser. No. 07/685,148 which has been incorporated herein by reference, this can be done by modifying the pad shape, the support structure or both. Specifically, the pad can be modified to include grooves, cuts, rails and recesses to achieve desired deformations under load. The support structure can be designed to support the pads for movement in the six degrees of freedom (i.e., translation or movement in the $+x$, $-x$, $+y$, $-y$, $+z$ and $-z$ directions) and rotation about the x, y, and z axes so as to optimize formation of the hydrodynamic wedge.

The lift pads and support structure used in the seal rings of the present invention may be designed in three dimensions to provide deflection with six degrees of freedom so as to ensure optimum wedge formation at all times.

In computer analysis of this system using a finite element model, the entire lift pad can be treated as a completely flexible member that changes shape under operating loads. By adding more or less flexibility through design of the basic structure, lift pad characteristics may be achieved that provide stable operation over wide operating ranges.

The present invention allows for movement of the lift pad in any direction (i.e., six degrees of freedom) to form a converging wedge shape; allows for the pad itself to change shape (e g., flatten) to improve performance; and allows the lift pads to compensate for misalignment of the supported part or shaft and to equalize loading among the lift pads.

The present inventor has discovered that important performance characteristics can be achieved by simply modifying the lift pad shape. Consequently, the support structure can be simplified, and in some cases, even eliminated.

Figure 9A:
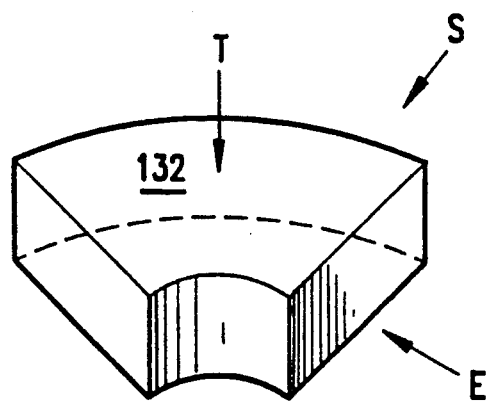
FIG. 9A is a perspective view of a sector shaped thrust pad with arrows indicating the side lines for the top side and edge views.
Figure 9B:
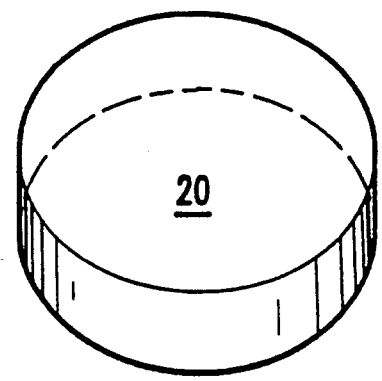
FIG. 9B is a perspective view of a circular thrust pad.

Examples of typical lift pad shapes according to the present invention are illustrated in FIGS. 9A and 9B. FIG. 9A shows a sector shaped pad 132. The sight lines for a top view T, an edge view E and a side view S are indicated by arrows labeled T, E and S, respectively. FIG. 9B shows a circular pad 20. The arrows indicate the sight lines for the top view T, edge view E and side view S discussed below. These pad shapes are all characterized by uninterrupted planar surfaces and a uniform pad thickness.

Various modifications to these pad shapes will be discussed hereinafter. It should be kept in mind that any of these modifications to the shape of the pad may be used in combination or alone. Also, the modifications can be easily adapted to pads having shapes other than the specific pad shapes illustrated. Moreover, the pads may be symmetrically shaped to allow bidirectional operation or non-symmetrically shaped to provide different operating conditions depending on the direction of rotation. The modified pad shapes discussed hereinafter may be used in combination with any support structures including those described in this application where appropriate or, when used in the proper combination, may eliminate the need for a deflecting support structure altogether.

Figure 10:
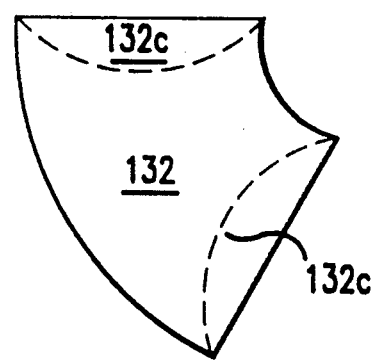
FIG. 10 is a top view of a thrust pad provided with radius cuts on both edges.

The first possible modification to the general pad shape is shown in FIG. 10.

This modification is based on finite element analysis which has shown that, in some instances, increasing the length of the edge where the lubricant enters (the leading edge) allows more lubricant to be directed toward the pad center. To achieve this effect, a radius cut may be formed on the pad surface to lengthen the leading edge. The cut may be formed either entirely through the pad or partially through the pad surface to provide a recess in the pad surface. It should be kept in mind that the provision of such a radius cut decreases the load bearing surface of the pad. Thus, there is a trade off; more lubricant but less load bearing surface.

FIG. 10 shows a top view of a lift pad 132 in which a radius cut 132C is formed as shown. In the illustrated embodiment, the cut 132C is provided on each edge of the pad 132. This is because the illustrated pad is intended for bidirectional use and the improved result is desired in both directions. If unidirectional operation is sufficient, the cut should only be provided on one edge.

Figure 11:
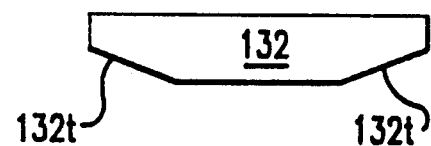
FIG. 11 is a side view of a thrust pad with tapered edges.

FIG. 11 illustrates another possible modification to the basic pad shape. Specifically, it has been learned that tapering the leading edge of the lift pad results in increased inlet bending. This allows more lubricant to enter into the space between the lift pad and the surface it supports thus increasing the load carrying capability of the pad. Finite element analysis using computers can predict the amount of bending needed to obtain optimum lubricant flow.

FIG. 11 is a side view along the S axis in FIG. 9A illustrating a lift pad 132 with a taper 132t formed at each edge. The taper is provided at each end to allow for bidirectional operation. Of course, if unidirectional operation is sufficient, only one edge, the leading edge, should be tapered.

The basic pad shape may also be modified by providing rails on the side edges of the pads such that, under load, the pad deflects to form a channel which retains lubricant on the pad face and minimizes end or side leakage.

Figure 12:
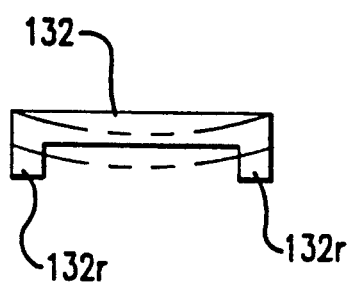
FIG. 12 is an edge view of a thrust pad provided with side edge rails.

FIG. 12 shows an edge view of a lift pad 132 provided with side edge rails 132r on the radially inner and outer edges. The deflection of this pad under load (greatly exaggerated) is indicated in phantom. As can be seen, the pad deflects under load to form a lubricant retaining channel.

Figure 13:
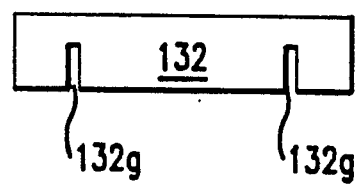
FIG. 13 is a side view of a thrust bearing pad having grooves formed in the bottom proximate the side edges.

As mentioned before, it is sometimes desirable to increase the inlet bending of the leading edge of a lift pad. Another modified lift pad shape for achieving or enhancing this desired result is shown in FIG. 13. This drawing shows that in addition to or instead of tapering the leading edge, a groove may be formed on the lower edge of the lower side of the pad proximate the leading edge to cause increased leading edge bending while maintaining a flatter surface. FIG. 13 shows a lift pad 32 with grooves 132g formed in the bottom near both edges to allow bidirectional operation.

Figure 14A:
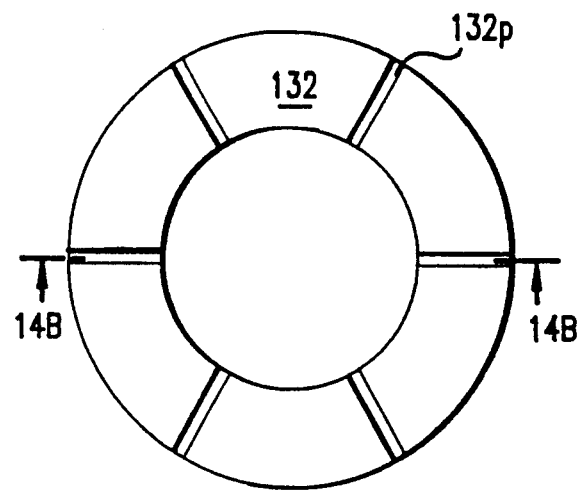
FIG. 14A is a top view of a thrust bearing in which the individual pads are defined by pad defining grooves.
Figure 14B:
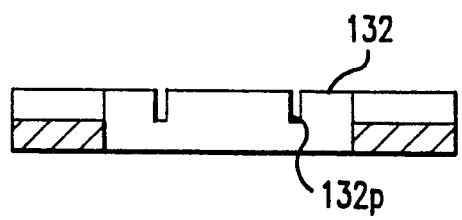
FIG. 14B is a sectional view of the thrust bearing of FIG. 14A along the lines indicated in FIG. 14A.

Another consideration in the design of hydrodynamic lift pads is that the pads themselves may be formed from a single member by simply providing grooves to define individual pads. FIGS. 14A-14B show how a continuous surface can be divided into individual lift pads 132 through the provision of pad defining grooves 132p. In this case, FIG. 14A is a top view and FIG. 14B is a side view along the lines indicated in FIG. 14A. In these drawings, the continuous sealing portion is not illustrated. As discussed below, a sealing portion may be connected to the illustrated bearing portion by thin ligaments.

Figure 15A:
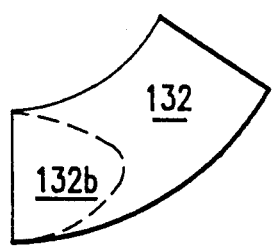
FIG. 15A shows a top view of a thrust bearing pad formed with a bottom recess indicated in phantom.
Figure 15B:
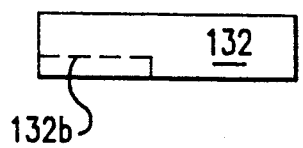
FIG. 15B shows a side view of the thrust bearing pad of FIG. 15A.

A final consideration in the design of specific lift pad shapes is the provision of bottom recesses on the pads. Specifically, the provision of bottom recesses can cause channeling in a manner somewhat like that shown in FIG. 12 and allow inlet bending in a way such as the tapered structure shown in FIG. 11. FIGS. 15A-15B show top and side views of a lift pad 132 formed with a bottom recess 132b to cause channeling. The reduced pad area also enables compressive deflections onto the bottom surface which develops a converging wedge. Since this modification is provided on only one edge of the pad 132, the pad is intended for use in a unidirectional seal.

Figure 16A:
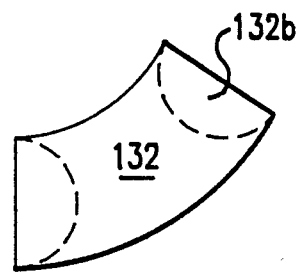
FIG. 16A is a top view of a thrust bearing pad formed with a bottom recess on each edge indicated in phantom.
Figure 16B:
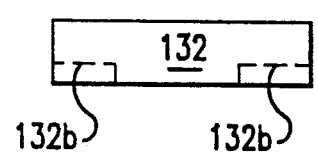
FIG. 16B is a side view of the thrust bearing pad of FIG. 16A with the bottom recesses indicated in phantom.

FIGS. 16A-16B illustrate lift pad configurations similar to those shown in FIGS. 15A-15B except that the bottom recesses 132b are provided at both edges of the lift pad so as to permit bidirectional operation. Specifically, the lift pad 132 shown in FIGS. 16A and 16B includes bottom recesses 132b at each edge thereof. As is apparent by comparing FIGS. 16A-16B with FIGS. 15A-15B, the bottom recesses are somewhat smaller to accommodate the provision of such recesses at each edge.

Figure 17A:
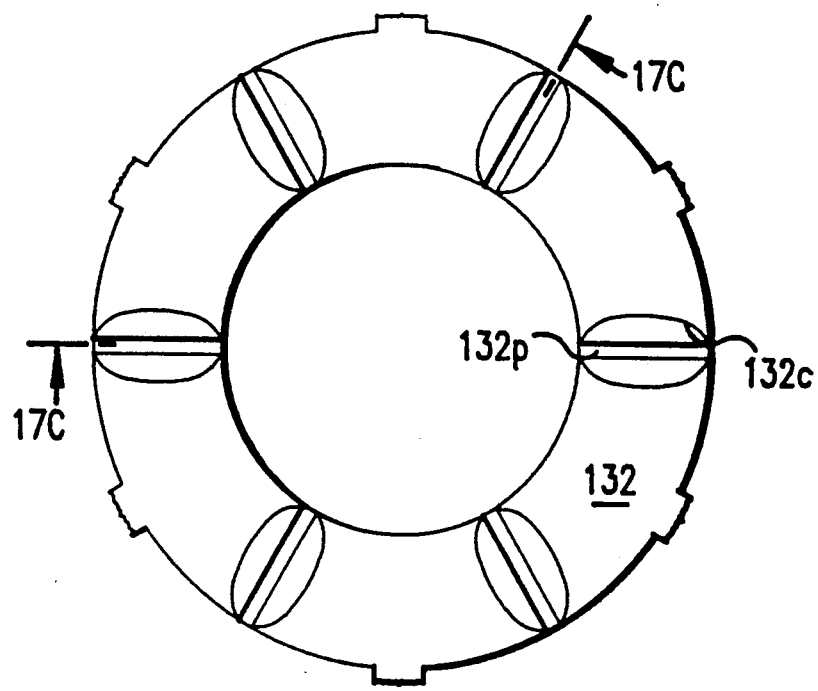
FIG. 17A is a top view of a thrust bearing.
Figure 17B:
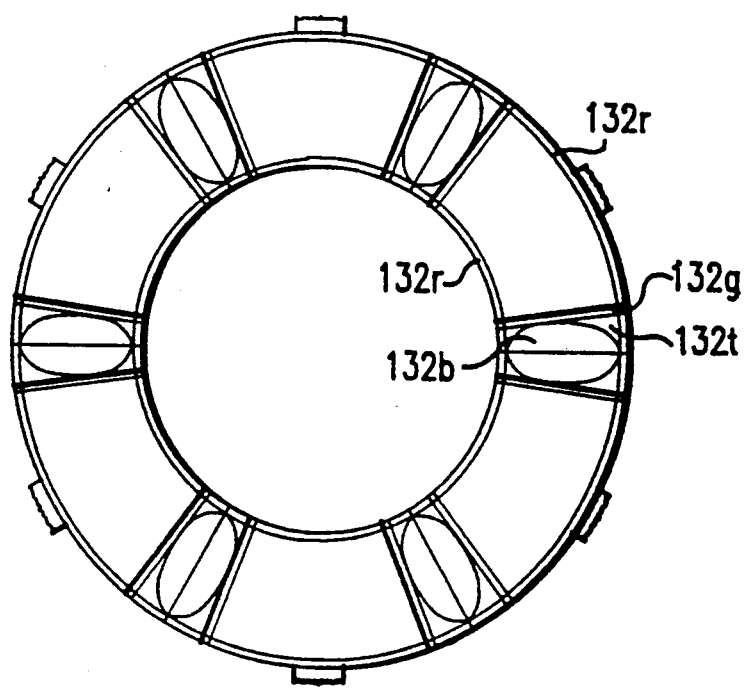
FIG. 17B is a bottom view of the thrust bearing of FIG. 17A.
Figure 17C:
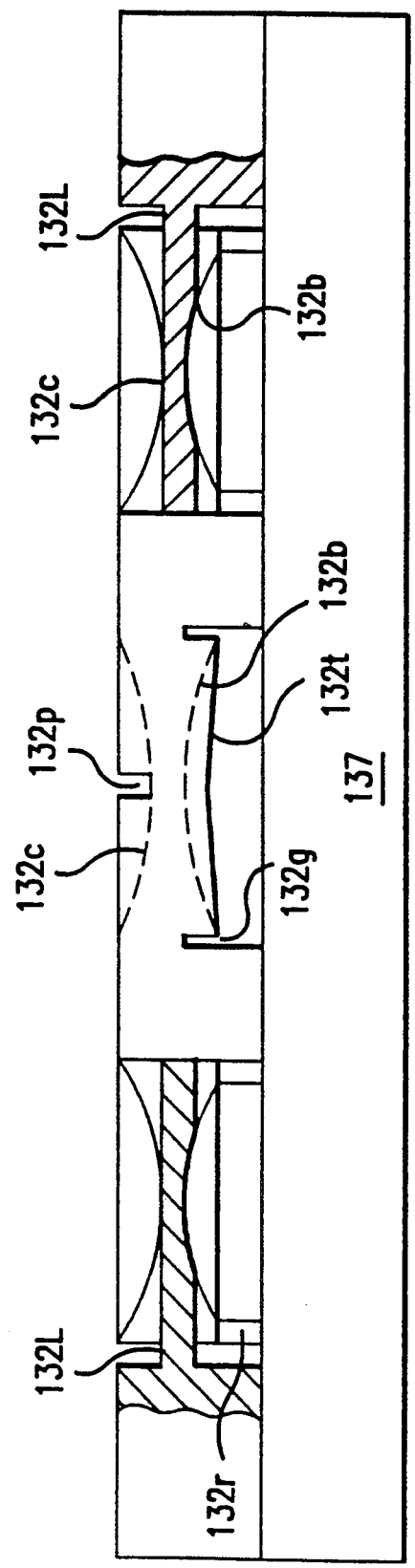
FIG. 17C is a cross-section through the lines indicated in FIG. 17A.

As mentioned before, the design of a lift pad shape for any particular application depends on the requirements of that application. The foregoing structural modifications and considerations can be used alone or in combination. FIGS. 17A-17C show how all these features can be combined in a single bearing portion. This is not to suggest that all these features should necessarily be included in every design. Indeed, this would rarely be required. However, it is possible to combine all these features in a single bearing portion, if desired.

FIG. 17C shows a top view of a bearing portion in which the lift pads 132 are provided with radius cuts 132C to increase the length of the leading edge. The radius cuts 132C are provided on each edge so as to permit bidirectional operation. Of course, if desired, the radius cuts 132C can be provided on only one edge to provide optimum results for unidirectional operation. In FIG. 17C, the individual pads 132 are defined by pad defining grooves 132p.

FIG. 17B shows a bottom view of the bearing portion of FIG. 17A. In this view, it can be seen that the lift pads include bottom rails 132r, grooves 132g to increase inlet bending, a taper 132t to further increase inlet bending and a bottom recess 132r to further channel liquid and increase inlet bending. In this case, the grooves taper, and recesses collectively provide the desired deflection.

FIG. 17C is a cross-section of the bearing portion of FIG. 17A along the lines indicated in FIG. 17A. FIG. 17C also shows that the bearing portion mounted includes a support structure 137. The support structure is shown schematically as a box to indicate that, in accordance with the present invention, any of the support structures disclosed herein can be used. As noted above, it is possible through proper pad design to obviate the need for a deflecting support structure. In such a case, the support structure could be rigid, e.g., the housing. Alternatively, however, the support structure can be a deflecting support structure of any of the types disclosed herein having primary, secondary and tertiary support portions for supporting the lift pads for movement with six degrees of freedom. Likewise, the pad modifications discussed herein are generally applicable individually or in combination to the lift pads of any of the bearing portions disclosed herein.

Figure 18A:
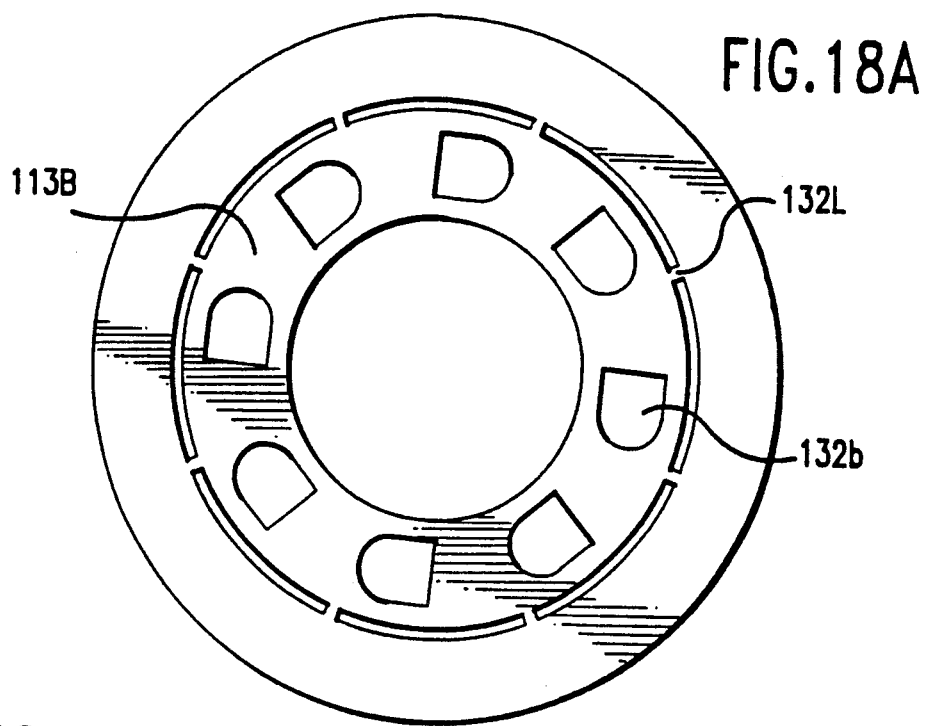
FIG. 18A is a bottom view of a seal ring according to the present invention.
Figure 18B:
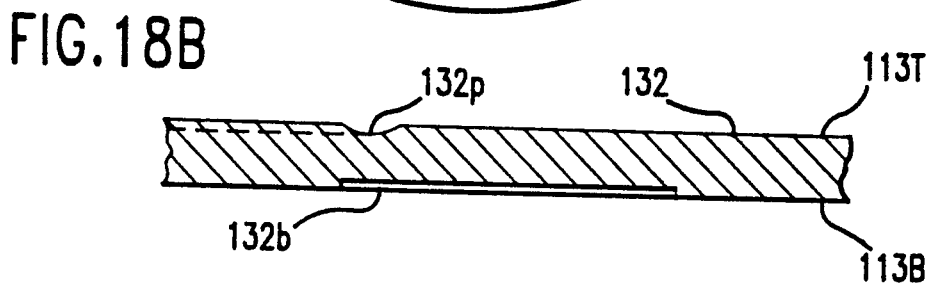
FIG. 18B is a partial sectional view of the seal ring of FIG. 18A along the lines indicated in FIG. 18A.
Figure 18C:
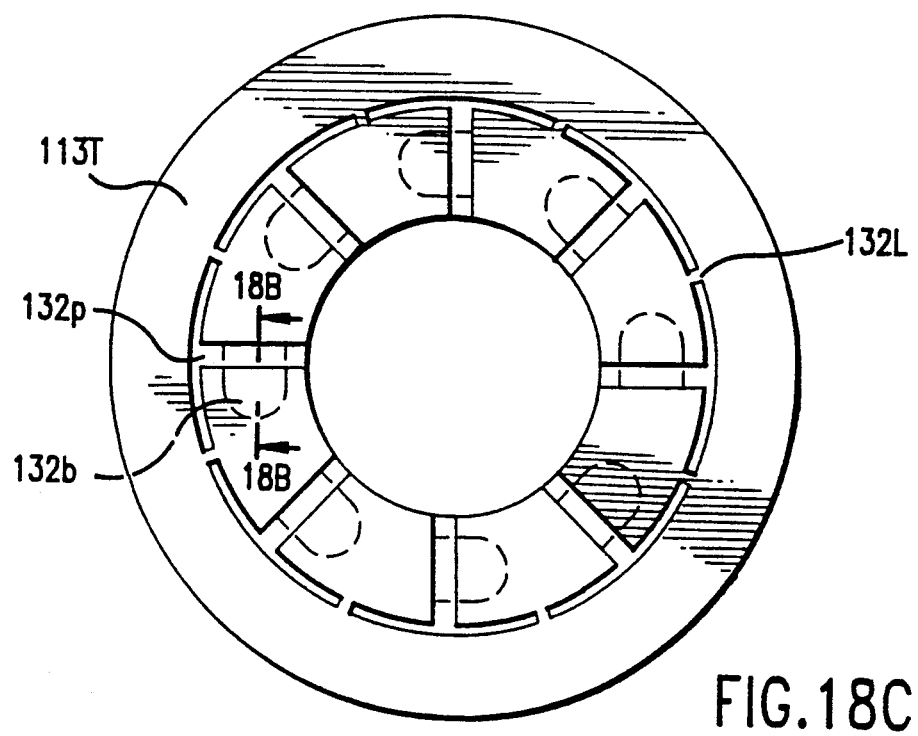
FIG. 18C is a top view of the seal ring of FIG. 18A.

Another complete seal ring design is depicted in FIGS. 18A-18C. These drawings depict a washer-like seal ring in which the desired pad shape is obtained in an extremely thin washer-like cylindrical element. The seal ring includes a bearing portion and a continuous flat smooth sealing portion. In this case, the sealing portion is located radially outward of the bearing portion. Of course, the reverse is possible, if preferred. FIG. 18A is a bottom view of the washer-like seal ring showing that circumferentially spaced bottom recesses 132b are provided on the bottom of the bearing portion. Additionally, arcuate grooves separate the bearing portion from the sealing portion except that a thin ligament connects each discrete lift pad to the sealing portion. Finally, FIG. 18C shows a top view of the washer-like seal ring showing that circumferentially spaced pad defining grooves 132p are formed in the top surface. The bottom recesses 132b are shown in phantom. The grooves in the top surface together with the bottom recesses define a plurality of discrete circumferentially spaced lift pads 132. The cross-section of the grooves 132p and bottom recesses 132b is best illustrated in the cross-sectional view of FIG. 18B. As shown in this figure, the grooves 132p and 132b are very shallow.

As previously discussed, the pad defining grooves 132p define a circumferentially spaced series of lift pads 132. The bottom recesses 132b undercut the pad surface to a sufficient extent that the portion of the lift pad surface that is undercut can deflect slightly downward so as to form a converging wedge and a lubricant retaining channel. Collectively, these deflections result in the formation of a series of converging wedges so that a layer of pressurized fluid film is formed between the lift pad and mating ring. Further, because of the nature of the bottom recesses 132b the lubricant is retained on the pad surface and does not escape from the radially inner and outer edges of the pad. Finite element analysis has shown that, under sufficient load, this simple seal ring will deflect so as to operate as a series of hydrodynamic lift pads even without a deflecting support structure. Thus, a simple washer-type seal ring configuration of the type shown in FIGS. 18A-18C can be mounted on a rigid support structure and still obtain satisfactory results. Of course, a deflecting support structure could be used, if desired.

Figure 19A:
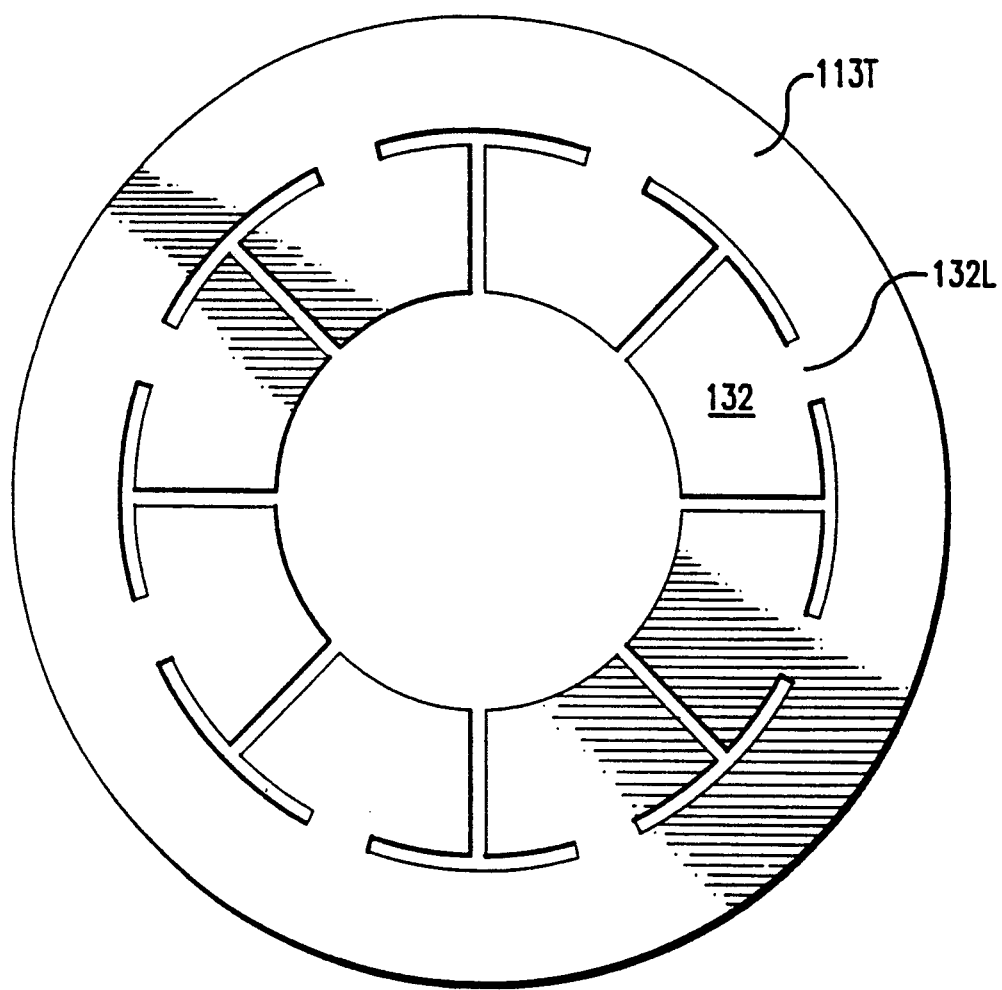
FIG. 19A is a top view of another sealing ring according to the present invention.
Figure 19B:
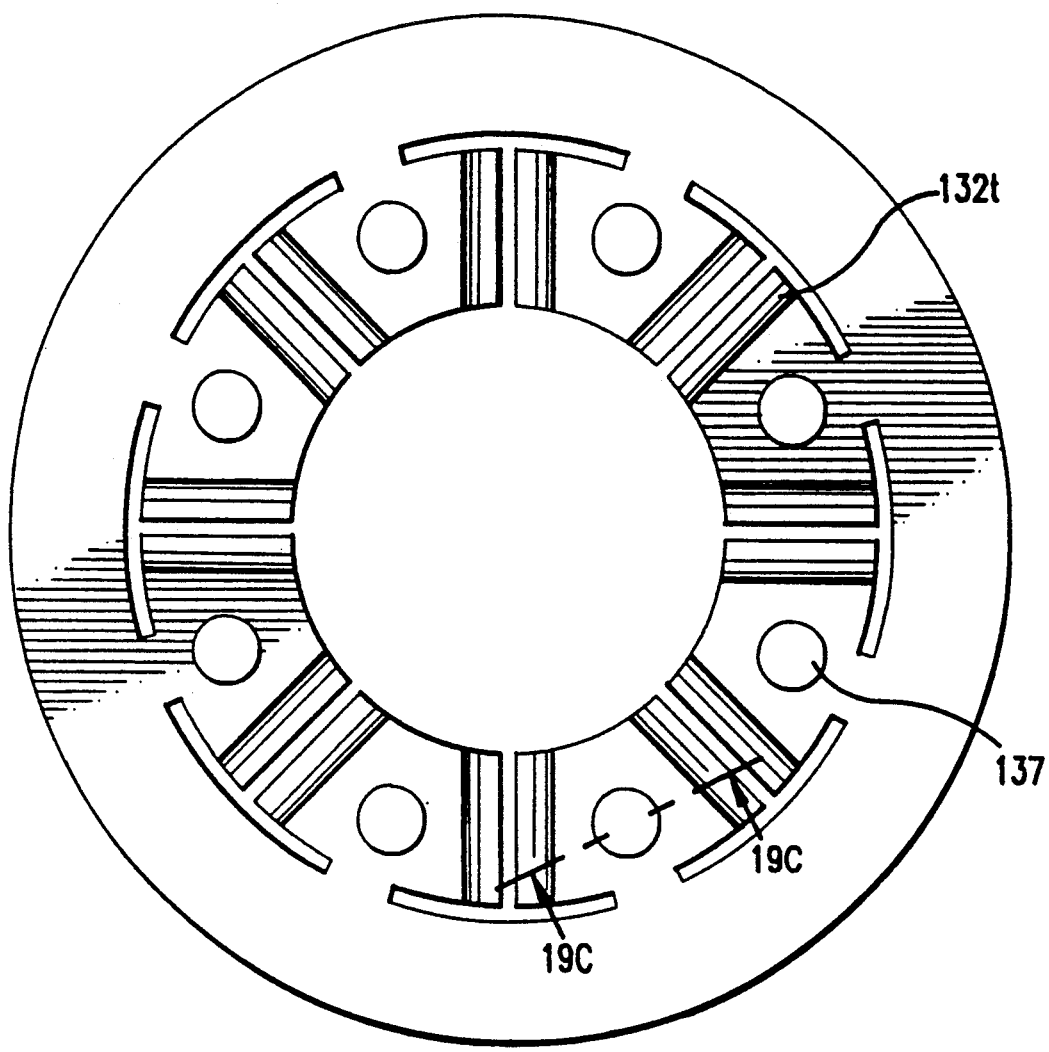
FIG. 19B is a bottom view of the sealing ring of FIG. 19A.
Figure 19C:
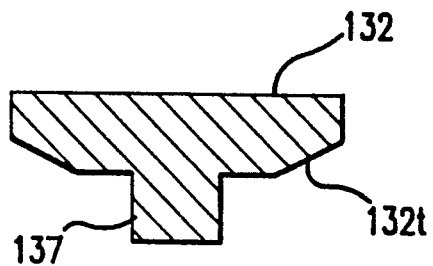
FIG. 19C is a schematic view of the lift pads of the sealing ring of FIG. 19A.

FIGS. 19A-19C show another seal ring according to the present invention. Like the previous embodiments, this seal ring includes a sealing portion and a bearing portion. In this case, the bearing portion is disposed radially inward of the sealing portion.

The bearing portion comprises a plurality of circumferentially spaced lift pads 132. The lift pads 132 are separated from one another by radially extending spaces. The pads 132 are largely separated from the sealing portion by circumferential spaces. The pads are, however, connected to the sealing portion by ligaments 132L. The ligaments are designed to connect the sealing portion to the lift pads so that the sealing portion is carried axially with the lift pads as a result of the pressurized fluid film between the lift pads and the mating ring. On the other hand, the ligaments are sufficiently flexible that they do not interfere too much with the deflection of the lift pads needed to cause formation of the pressurized fluid film between the seal ring and the mating ring.

In the embodiment shown in FIGS. 19A-19C, the lift pads 132 are supported on a rigid support structure in the form of a post 137. The post 137 is located nearer to the outer periphery of the lift pad 132 than to the inner periphery. Additionally, the lift pads tend to deflect downward to limit centrifugal leakage.

The lift pads can be supported for deflection so as to retain the hydrodynamic fluid, thus obviating the problem of fluid leakage. The pad is supported so as to tilt toward the seal ring's inner diameter under load so as to prevent centrifugal leakage. Generally, this is achieved when the pad support surface at which the primary support structure supports the lift pad is located closer to the lift pad outer diameter than to the lift pad inner diameter. When the primary support structure includes two or more radially spaced beams, the overall support structure must be designed to cause deflection of the bearing pad at the inner end. Further, when the lift pad is supported by a plurality of radially spaced beams and the region between the beams is not directly supported, the pad will tend to deflect so as to form a concave fluid retaining channel.

The configuration of the lift pads is best shown in FIGS. 19B and 19C. As shown therein the lift pads 132 have a generally arcuate shape. Both radially extending edges of the pads are tapered as shown at 132t as discussed earlier with respect to FIG. 11. The provision of such tapers allows increased inlet bending regardless of the direction of relative movement between the lift pad 132 and the surface it opposes. Finite element analysis has shown that the inlet bending allowed by this lift pad configuration provides proper wedge formation under certain load conditions.

As noted earlier, the seal rings of the present invention all include a sealing portion and a bearing portion. The bearing portion may be located either radially inward or radially outward of the sealing portion as appropriate. To illustrate this point, FIGS. 20A-20C illustrate the seal ring configuration of FIGS. 19A-19C modified such that the lift pads 132 are located radially outward of the sealing portion.

Figure 20A:
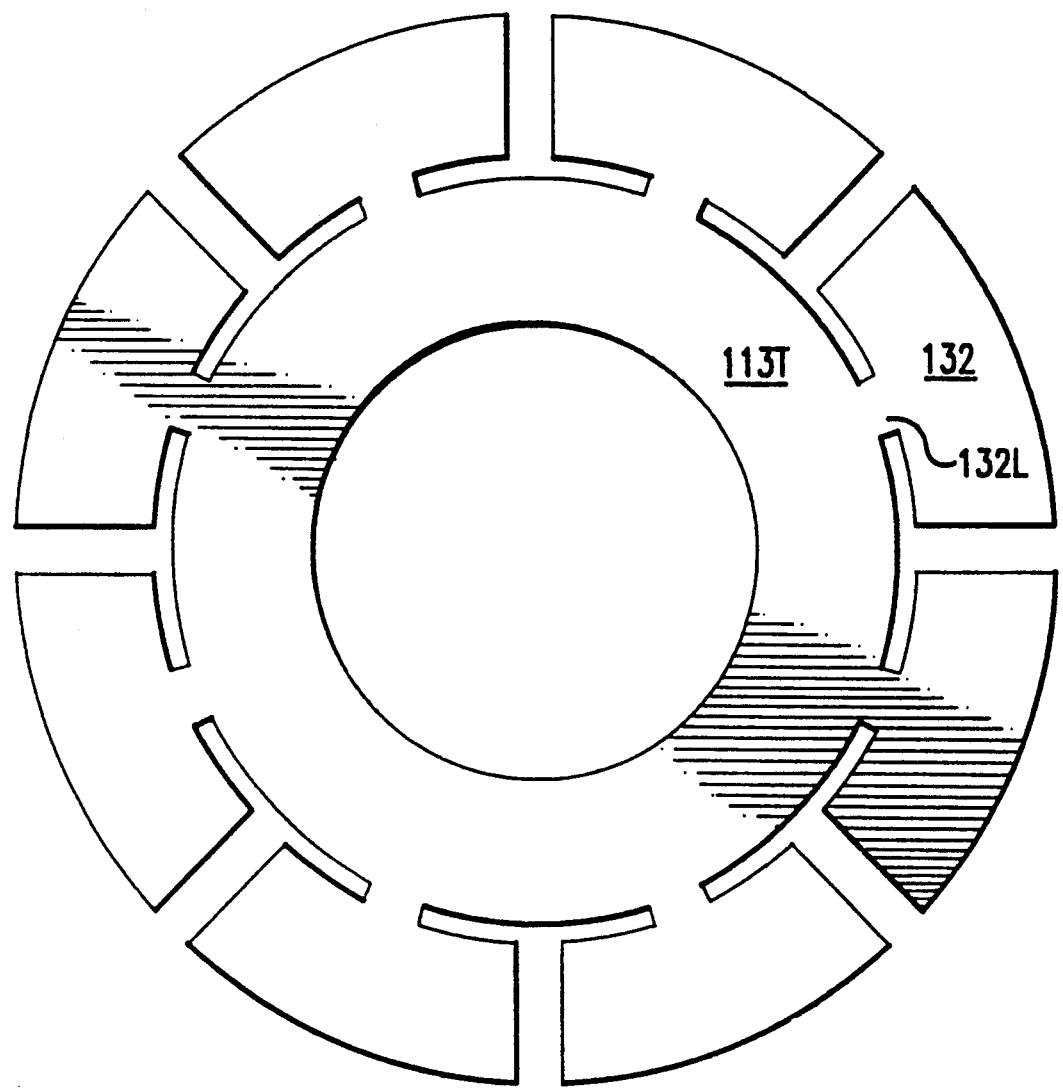
FIG. 20A is a top view of another sealing ring according to the present invention.
Figure 20B:
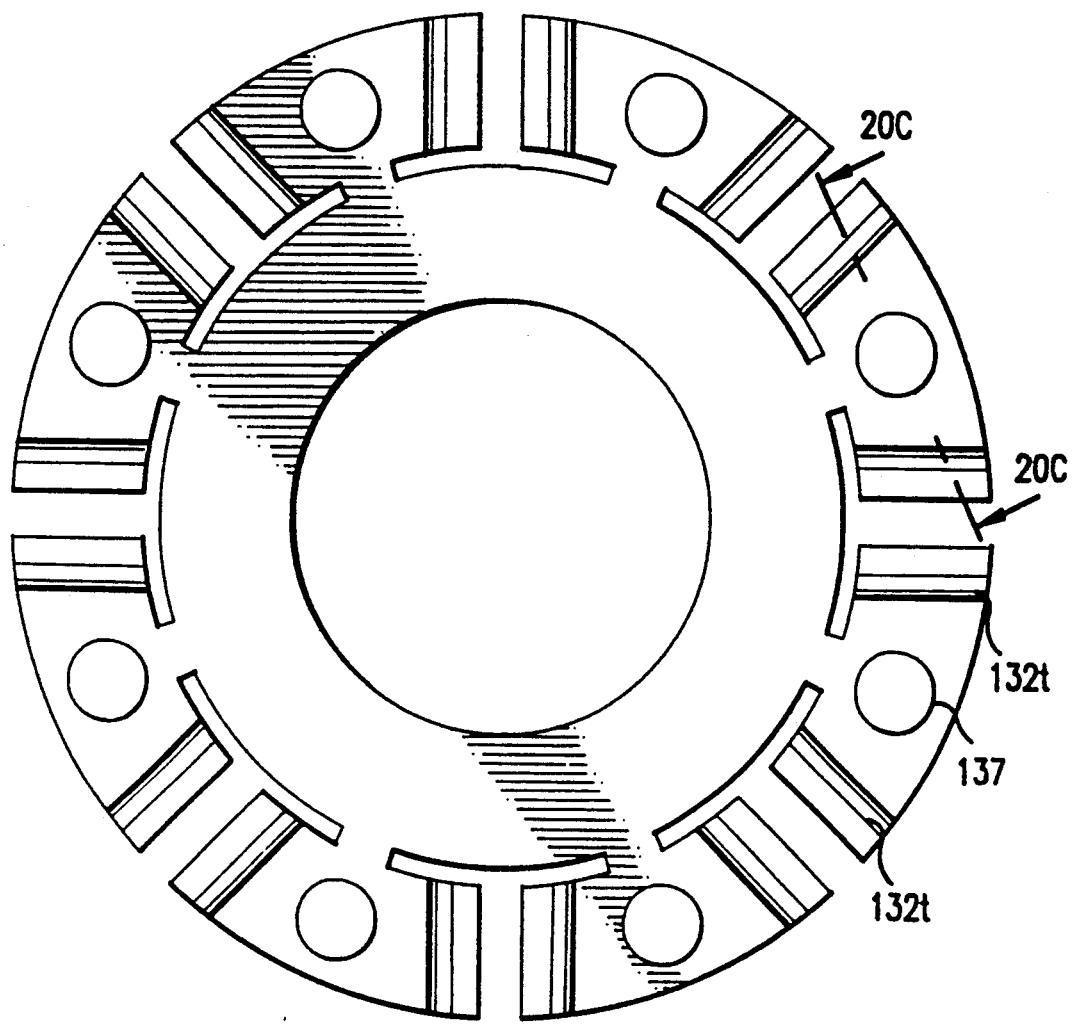
FIG. 20B is a bottom view of the sealing ring of FIG. 20A.
Figure 20C:
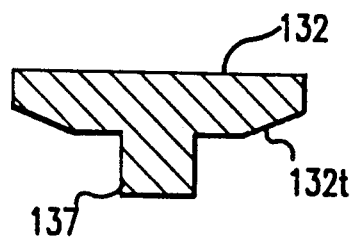
FIG. 20C is a schematic view of the lift pads of the sealing ring of FIG. 20A.

The seal ring shown in FIGS. 20A-20C is similar to that of FIGS. 19A-19C except for the radial arrangement of the lift pads relative to the sealing portion. In particular, the lift pads 132 are connected to the sealing portion by ligaments 132L. The lift pads 132 also include a rigid post-like support structure 137 and tapered edges 132 for the reasons discussed above in regard to the embodiments of FIG. 11 and FIGS. 19A-19C.

In the above examples, the bearing pads are formed with a tapered pad shape and are supported on a solid pedestal to provide a simple hydrodynamic bearing effect. If desired, the support structure for each of the discrete bearing or lift pads sections could include any of the support structure configurations known from applicant's previous patent application. However, it is important to keep in mind that manufacturing simplicity is an important feature of the present invention. Hence, the simple support structure and pad configuration shown herein appears to provide favorable results.

One manufacturing consideration is ease of molding. The seal ring constructions of the present invention are capable of being molded by some molding technique. However, only certain shapes can be injection molded in a simple two-piece mold, i.e., a mold which does not include cams. Another advantage of the seal rings of the present invention is that they can be constructed with easily moldable shapes which are defined as shapes which can be injection molded using a simple two-piece mold. An easily moldable shape generally is characterized by the absence of "hidden" cavities which require cams for molding.

Other easily moldable seal rings are possible. Several such constructions are discussed below with reference to FIGS. 21A-22C. In describing these constructions only the bearing portion of the sealing ring is depicted. It is to be understood that the sealing portion is a continuous ring as in the previous embodiments and that the sealing portion is connected to the bearing portion by ligaments as described above. Moreover, the sealing portion may be located either radially inward or radially outward of the bearing portion.

Figure 21A:
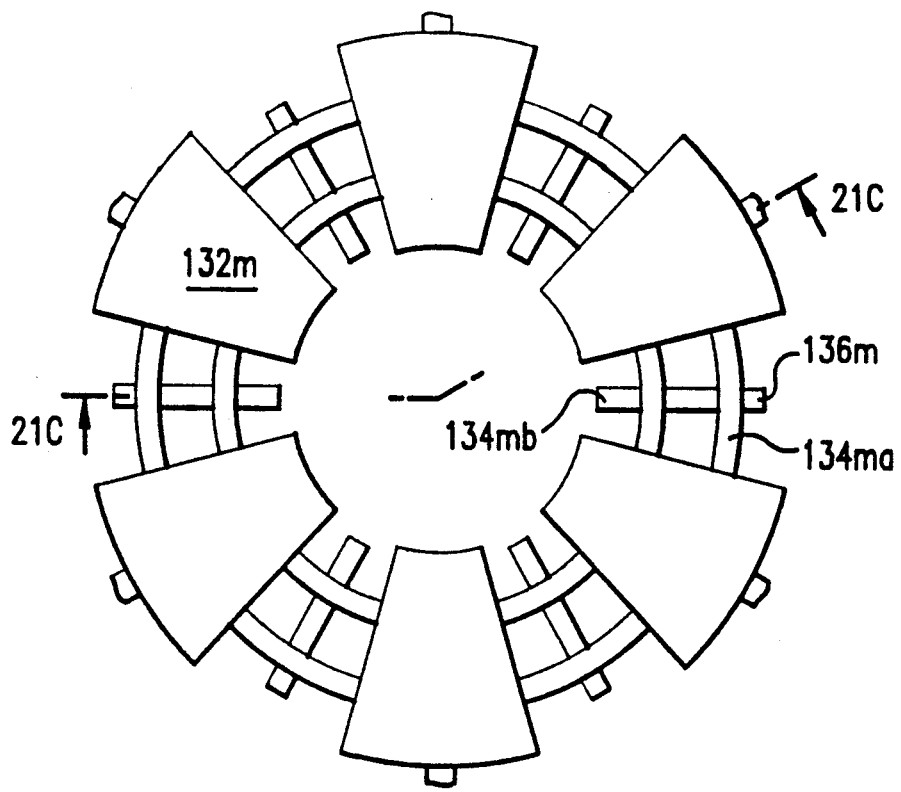
FIG. 21A is a top view of an easily moldable thrust bearing according to the present invention.
Figure 21B:
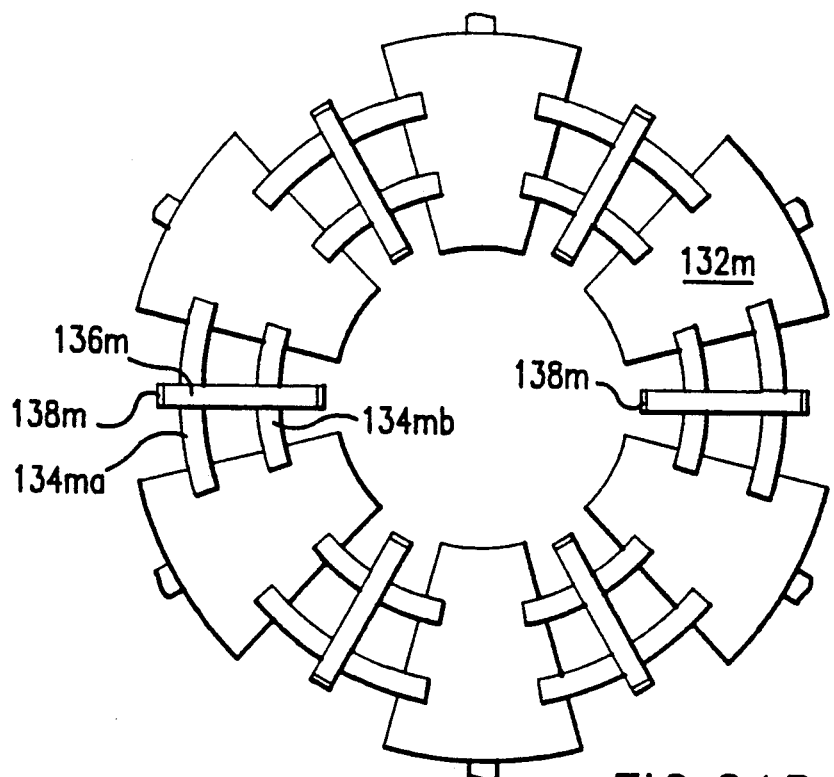
FIG. 21B is a bottom view of the bearing of FIG. 21A.
Figure 21C:
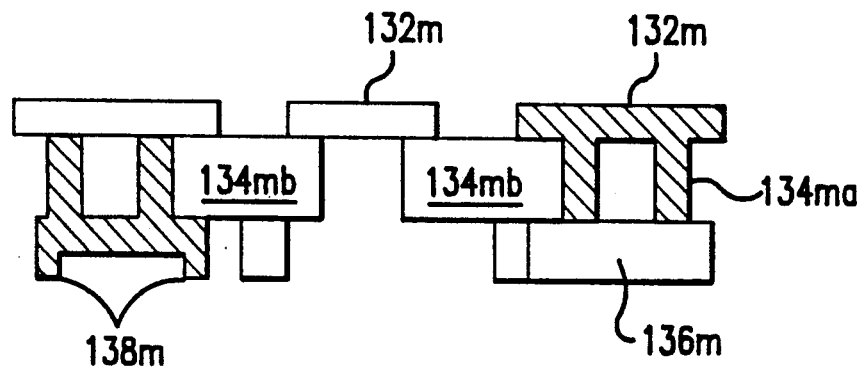
FIG. 21C is an exploded cross-section along the lines indicated in FIG. 21A.

FIGS. 21A-21C illustrate another easily moldable seal ring. The bearing portion includes a plurality of circumferentially spaced lift pads 132m and a support structure supporting each of the lift pads 132m. The support structure includes a primary support portion which includes circumferential beams 134mb and 134ma, a secondary support portion which includes radially extending beam 136m and a tertiary support portion which includes the stub-like pair of beams 138m. It should be noted that, in FIGS. 21A-21C, the dimensions of the support structure are somewhat distorted to provide clarity. For instance, as shown in FIG. 21C, the circumferential beams 134ma and 134mb are shown as extremely thick. Such a beam structure would provide a very rigid support for the lift pads 132m and in practice, such a rigid support would probably not be necessary or desirable.

Variants of the specific moldable beam structure illustrated are possible. For instance, either or both of the spaced circumferential beam segments 134ma or i34mb could be formed as a continuous circumferential beam element. Additionally, the secondary support portion could include a plurality of radially extending beams between each lift pad 132m. Further, the primary support structure could be modified to include three or more circumferential beam segments connecting each pair of adjacent lift pads and/or circumferential beam segments; also, segments of different radial widths could be used. Further, the stub-like beam portions 138m could be provided along the radially extending edges of the beams 136 rather than the circumferentially extending ends. Finally, as with any seal ring support structure in accordance with the present invention, the structure could also be varied by varying the length or thickness of any of the elements in the support structure to modify the deflection characteristics of the support structure.

Figure 21D:
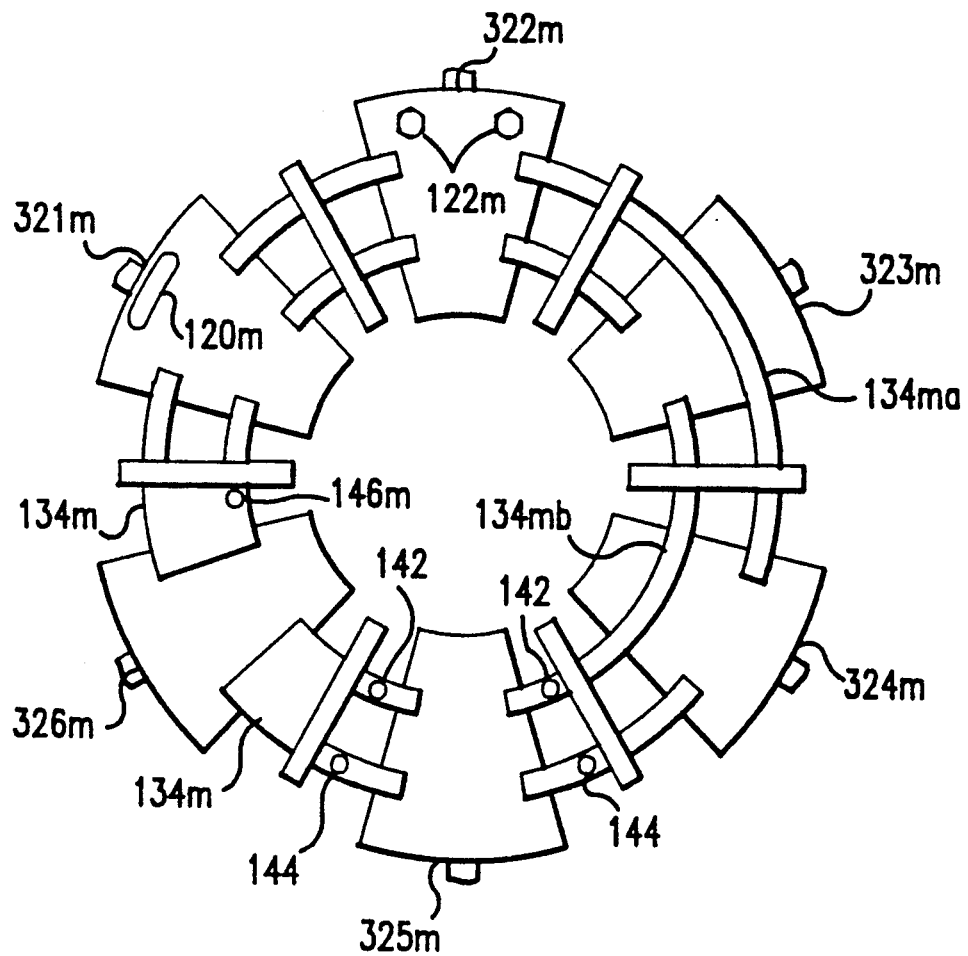
FIG. 21D is a bottom view illustrating modifications of the bearing illustrated in FIGS. 21A–C.

In order to illustrate a number of possible support structure constructions, FIG. 21D depicts a different support structure for each of the lift pads 321m--26m. In particular, FIG. 21D is a bottom view with the modifications illustrated herein. It should be understood that these various support structures are shown in a single seal ring for purposes of illustrating the present invention. In normal use, each of the lift pads 321-326m would have a similar, though not necessarily identical, support structure to assure uniform performance.

The support for lift pad 322m differs from that for the lift pads 132m in that an oval shaped projection extends from the back of the bearing pad surface to provide a rigid support for the outer circumferential edge of the lift pad 321m. By virtue of this construction, the lift pad 321m would be extremely rigid at its outer circumferential end.

The support for lift pad 322m is similar of that to 321m except that rather than a single large projection, two smaller projections 122m extend from the bottom of the bearing portion proximate the outer circumferential edge of the lift pad. Like the projection 120m, these two projections 122m provide rigidity to the outer circumferential edge of the lift pad 322m. However, this construction allows the lift pad to deflect in the unsupported region between the projections.

The lift pad 323m is supported by a modified support structure which includes a continuous circumferential beam 134ma in the primary support portion. Similarly, the lift pad 324m includes a continuous inner circumferential beam 134mb. The provision of such continuous beams increases the rigidity of the bearing support structure.

The support structure for lift pad 325 is modified by the provision of large openings 142m in the inner beam 134mb and smaller openings 144 in the outer beam 134ma. The provisions of these openings increase the flexibility of the beams. Naturally, the larger openings increase the flexibility of the beams to a greater extent than the small openings 144. Variants of this support structure include the use of different sized openings or a different number of openings to bias the lift pad 325m in a predetermined direction.

The lift pad 326m is supported by a modified structure in which the primary support portion includes a membrane 134m rather than a pair of beams. In the illustrated example, one of the membranes is provided with a opening 146 to bias the lift pad 326m in a predetermined direction. Of course, the provision of the opening 146m is not necessary and if desired, a number of openings could be provided.

As is evident from these drawings, the moldable seal rings do not include any hidden cavities which would necessitate the use of a complex mold and/or a mold including a displaceable cam. In particular, since each surface of the seal ring structure is directly visible in either the top view of FIG. 21A or the bottom view of FIG. 21B, the bearing can be simply molded using a two piece mold. Specifically, a first mold piece defines those surfaces which are directly visible only in the top view of FIG. 21A. The second mold piece defines those surfaces which are only visible in the bottom view of FIG. 21B. Surfaces having edges visible in both FIGS. 21A and 21B can be molded using either or both molds. In the illustrated seal ring, easy moldability is achieved because the secondary and tertiary support portions are circumferentially located in the space between lift pads. The modifications illustrated in FIG. 21D do not alter the easy moldability of the seal ring.

More complex variants of the moldable seal ring illustrated in FIGS. 21A-21D are possible. In particular, any of the previously discussed modifications of the seal ring structure which can be adapted to easy molding could be employed. For instance, the primary support beams could be continuous. Thus, the provision of an easily moldable seal ring does not necessarily require a simple seal ring construction. An example of a more complex seal ring structure is illustrated in FIGS. 39A-39C.

Figure 22A:
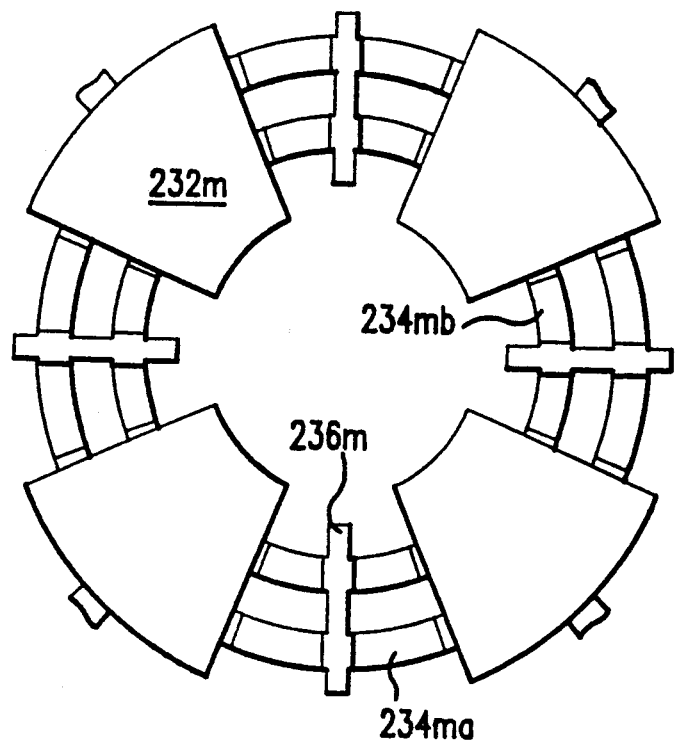
FIG. 22A is a top view of another easily moldable thrust bearing according to the present invention.
Figure 22B:
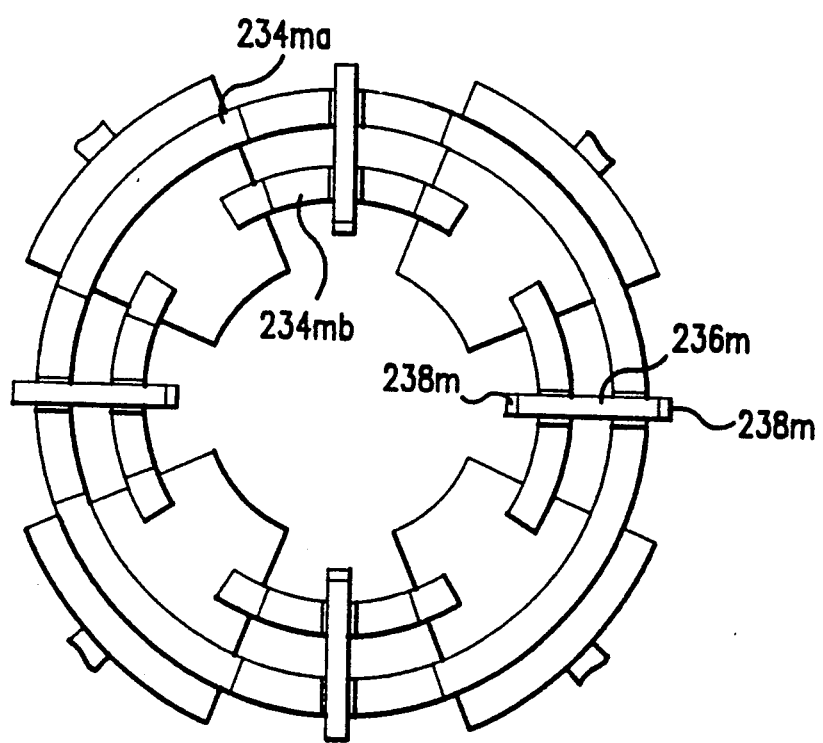
FIG. 22B is a bottom view of the bearing of FIG. 22A.
Figure 22C:
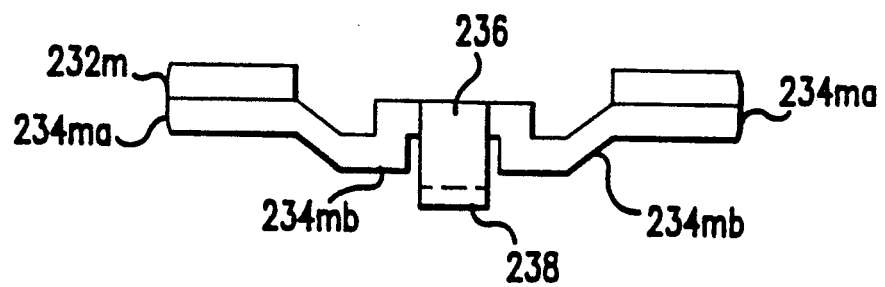
FIG. 22C is a partial cross-section showing the support structure for the bearing pads in the bearing of FIGS. 22A and 22B.

As illustrated in FIGS. 22A-C, the seal ring includes a plurality of circumferentially spaced lift pads 232m supported by a lift pad support structure. The secondary and tertiary portions of the support structure are similar to corresponding portions of the support structure of FIGS. 21A-21D. However, the seal ring of FIGS. 22A-C differs from the seal ring of FIGS. 2IA-D in that, in the seal ring of FIGS. 22A-C, the primary support portion includes a plurality of complex beams 234. Specifically, each lift pad is supported by a radially outer continuous complex circumferential beam 234ma. The pads are further supported by the plurality of spaced circumferential complex beams 234mb. The complex shapes of the continuous beam 234ma and the beam segments 234mb can be best appreciated with reference to FIG. 39C which shows, somewhat schematically, the profile of the complex beams 234. In operation, the beams 234ma and 234mb function as a beam network.

Thus, it can be seen that numerous complex seal ring constructions can be provided while retaining the ability to mold the seal ring with a simple two-piece mold, i.e., easy moldability. Naturally, each structure provides unique deflection characteristics which must be considered in designing the seal ring for optimum wedge formation.

The present invention also relates to the structure for maintaining stability of the sealing ring and the mating ring and to maintaining parallel alignment of their faces. In the absence of stability and parallelity, the rings may distort clockwise or counterclockwise due to excessive heat generation or heat removal resulting in contact between faces with subsequent face damage or seal destruction. In accordance with another aspect of the invention, these pressure and temperature deflections are minimized by the self-aligning support structure provided on at least one of the sealing ring and the mating ring.

In the preferred embodiment of my invention, this self-aligning feature is obtained by providing a flexible support structure for the sealing ring.

A unique aspect of the present invention is that in those seal ring constructions in which the lift pads are supported by beam-like structures, the necessary spring force can be built into the beam-like support structure. This is because such a support structure can support the lift pads for movement with six degrees of freedom. Through design of the support structures in terms of thickness and orientation of the beams, the appropriate spring constant can be provided to the lift pads. By way of example with reference to the embodiments of FIGS. 22A-22C it can be seen that the lift pads 232 are supported on a beam-like support network best shown in FIG. 22C so that the pads are supported for deflection up and down as shown in FIG. 22C. The resistance to such deflection, i.e., the spring constant of the support structure, is determined by the rigidity of the beam network which supports the lift pads. In effect, the beam network operates as a spring. Thus, it can be appreciated that the appropriate design of the support structure for the lift pads and the need for a separate spring element can be eliminated.

A beam-like support structures of the type shown in FIGS. 22A-C can be used as a separate support for seal rings which do not have flexible support structures. Thus, for example, in the case of a seal ring construction such as that shown in FIGS. 7-8, the seal ring itself might be supported on a beam-like spring support structure instead of a more conventional spring of the type shown in FIG. 5. It is easier to use a beam-type spring network in those cases where the support structure is flexible since this eliminates the need for a separate spring.

Understanding that the support structure can be used to provide the necessary spring force for a gap-type seal assembly, it can be easily appreciated that the support structure itself ensures proper alignment of the sealing face with respect to the face of the mating ring so as to avoid the problems discussed above resulting from instability. Thus, in accordance with the present invention, the beam-like support structures described herein can be used to provide a self-aligning construction in which one of the rings automatically aligns itself relative to the other ring to ensure that the opposed sealing faces are parallel to one another. This construction also provides a self-biased sealing ring in which a spring constant is built into the seal ring support structure to eliminate a separate spring or assist a separate spring.

In accordance with the present invention, the need for close tolerances between the bearing pad and the shaft portion to be supported can be obviated by dimensioning the bearing so as to eliminate the spacing between the bearing pad and the shaft portion to be supported.

As noted previously, there is still a need for a hydrodynamic radial bearing which can be used in connection with a gap-type seal. Conventionally, only rotating element type bearings are suitable for gap-type mechanical seals because of the risk of mechanical run out. Specifically, in any mechanical gap-type seal, it is essential that the shaft remain centered. In other words, the shaft should not be allowed to float within a radial envelope as is conventional in hydrodynamic bearings. In rotating element type bearings, shaft centering is not a problem because the shaft is in effect maintained in solid contact with the housing. With conventional hydrodynamic bearings, however, the shaft is separated from the housing by a spacing known as the radial envelope and in operation the shaft is supported on a fluid film. Thus, because of the spacing between the shaft and the bearing surface in conventional hydrodynamic bearings, the center of the shaft tends to vary during operation. This movement of the shaft leads to a problem known as "shaft run out" which defeats the operation of the mechanical seal.

The improved gap seal of the present invention also contemplates the use of an improved deflection pad bearing that provides better shaft centering over the operating speed range than current bearings while also maintaining good rotor dynamic stability. Specifically, the present invention provides a new bearing design in which the stability characteristics of traditional bearings are maintained while also providing better shaft centering characteristics.

Specifically, the mechanical gap seal of the present invention preferably includes a deflecting tilt pad bearing designed to maintain shaft centering. The bearing construction is a deflection pad bearing of the type described in applicant's previous application Ser. No. 07/685,148 which has been incorporated herein by reference. However, the bearing is somewhat different in that at least some of the bearing pads are provided with a support structure that allows the bearing pads to contact the shaft at rest. These bearing pads which are in contact with the shaft at rest maintain the shaft in the proper centered position.

Figure 23:
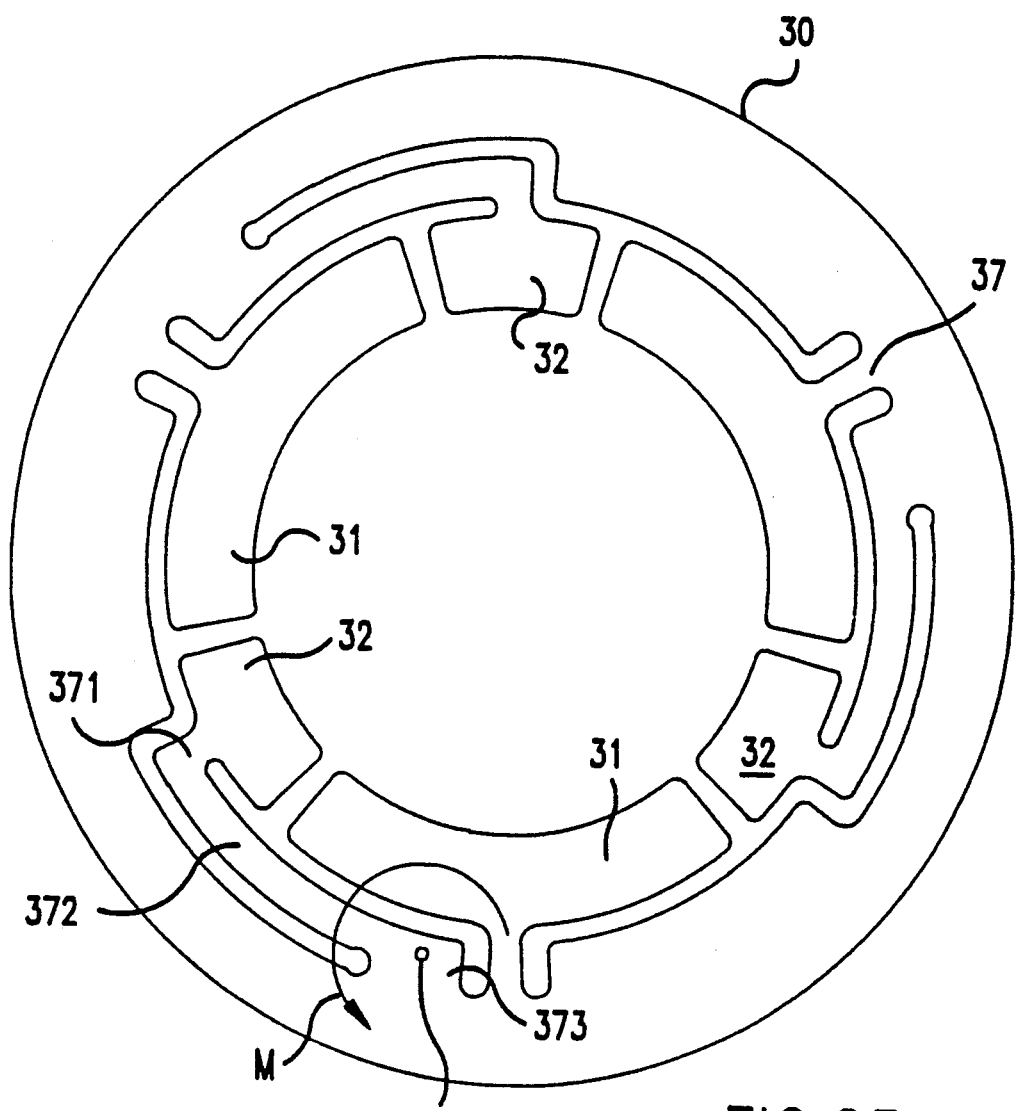
FIG. 23 is a side view of a deflection pad bearing for use in the seal of the present invention.

FIG. 23 shows a side view of one hydrodynamic bearing suitable for use in the mechanical gap-type face seal of the present invention. In the manner described in the previous application incorporated herein by reference, this bearing may be formed by cutting cuts and grooves in a cylindrical bore. The bearing can, of course, also be manufactured according to any known technique.

FIG. 23 shows a cross-section of the three pad positive-centering deflection pad bearing 30 developed for use with the mechanical seal of the present invention. For ease of description the bearing will be described as if it was formed from a cylindrical bore. As shown in FIG. 23, the bearing includes two different types of bearing pads. The first type is relatively short pads indicated at 32. The second type is relatively long pads indicated at 31. The relatively short pads 32 operate as flexible centering pads. These pads begin at zero clearance i.e., shaft contact and expand at design speeds under hydrodynamic pressure to a larger operating clearance. The larger, centrally pivoted pads 31 offer low pivot rotational stiffness and high radial stiffness to attenuate unbalanced response and maintain stability.

The operation of the larger centrally pivoted pads 31 is similar to conventional pivot type pads for use in hydrodynamic bearings. In particular, the pads 31 are supported by a single ligament 37 for simple flexibility in the plane of the paper of the drawing. In essence, the larger pads 31 have a support structure 37 which allows simple pivoting of the pad 31. It is known that a simple pivoting construction like this provides adequate support at operational speeds.

To ensure proper shaft centering and support at start up, the smaller pads 32 have a more flexible support structure. Specifically, the support structure of the pads 32 includes a primary support portion 371 in the form of a stub type shaft, a secondary support portion in the form of a elongated circumferential beam 372 and a tertiary support portion 373 in the form of a stub shaft connecting the secondary support portion 372 to the base or outer periphery of the bearing 30. Because of the elongated nature of the beam 372, any force acting on the surface of the pad 332 causes pivoting about a pivot point PP as is clearly evident in FIG. 23. This pivot point PP is located circumferentially beyond the trailing edge 32t of the bearing pads 32. As a consequence, any force acting on the pad 32 causes a moment M to be generated in the direction shown in FIG. 23. This ensures that under static state, contact between the pad 32 and the shaft occurs only at the trailing edge of the pad. In this way, a preformed wedge is formed even in the static state.

Moreover, the contact between the trailing edge of the pad 32 and the shaft maintains the shaft center in the proper position. Thus, immediately upon start up a hydrodynamic effect occurs while at the same time the shaft is properly centered and shaft run out does not occur. Thus, this hydrodynamic bearing, unlike known hydrodynamic bearings, can be used in a mechanical face seal of the gap type. The advantages of hydrodynamic bearings versus rolling element type bearings are set forth in applicant's previous application which has been incorporated herein by reference. An additional important advantage occurs at high speed where rolling element bearings are subject to rapid wear, but hydrodynamic bearings perform without wear because there is no shaft-to-pad contact.

The particular bearing construction shown in FIG. 23 includes two types of pads support structures. This provides a wide range of support conditions. It should be understood, however, that bearings could be designed such that each of the pads are supported in the same way. If such a bearing is to be used with a mechanical face seal of the gap type, then each support structure should, like the support structure of the bearing pads 32 be designed such that the pivoting caused by static load occurs beyond the trailing edge of the pad in the manner shown in FIG. 23 so that under static loading the pads are deflected so that only their trailing edge contacts the shaft. This ensures that a preformed wedge is formed and at the same time properly centers the shaft.

What is claimed is:

1. A gap-type rotary mechanical seal assembly comprising: a housing; a shaft; relatively rotatable sealing members having substantially radially disposed confronting sealing faces, one of the sealing members being secured to the shaft for rotation therewith, the other sealing member being supported in the housing, one of the sealing members being axially movable relative to the other member; a hydrodynamic bearing for supporting the shaft in the housing, the hydrodynamic bearing comprising a plurality of spaced bearing pads, each bearing pad being supported by a support structure, at least one of the bearing pads being supported such that under static load the bearing pad deflects such that the trailing edge contacts the shaft so as to maintain the shaft in a centered position; at least one of the sealing members comprising a ring having a bearing portion and a sealing portion, the bearing portion including a plurality of spaced pad sections, each pad section having a shape and support structure such that under load the sealing surface of the pad deflects to form a hydrodynamic wedge; and at least one of the sealing members being supported on a support structure for movement with six degrees of freedom.

2. The mechanical seal of claim 1, wherein the member having the bearing part is provided with a plurality of grooves on the side of the member opposite the sealing surface, the grooves extending from one circumferential end of the member and terminating short of the other side of the member.

3. The mechanical seal of claim 1, wherein the member having the sealing portion and the bearing portion is in the form of a ring, the bearing portion of the ring being provided with discrete lift pad portions.

4. The mechanical seal of claim 3, wherein each of the discrete lift pads is supported by a support structure for movement with six degrees of freedom.

5. The mechanical seal of claim 3, wherein each of the lift pads is provided with a taper on at least the leading edge of the lift pad such that under load the leading edge of the lift pad deflects downward so as to permit the entry of hydrodynamic fluid.

6. The mechanical seal of claim 1, wherein the sealing member has both a sealing portion and a bearing portion is in the form of a ring and the bearing portion is defined by a series of pad defining grooves formed on the sealing face of the ring and a spaced series of recesses formed on the opposite side of the ring; the recesses provided on the opposite side of the ring such that under load the surface of the bearing portion tends to deform downward to provide pressurizing pockets.

7. A rotary mechanical seal comprising relatively rotatable sealing members having substantially radially disposed confronting sealing faces, one of the members being axially movable relative to the other member, one of the members comprising a ring having a bearing portion and a sealing portion, the ring comprising a plurality of spaced lift pads and a support structure for supporting the lift pads, each of the lift pads having a flat pad surface facing the other member, a support surface facing the support structure, a leading edge, a trailing edge and two side edges.

8. The seal of claim 7, wherein the ring further comprises a plurality of rails formed on the support surface facing the support structure, the rails extending along the side edges of the lift pad and contacting the support structure such that under load the portion of the pad between the rails deflects toward the support structure.

9. The seal of claim 7, wherein the support structure is rigid.

10. The seal of claim 7, wherein the support structure includes a plurality of beams for supporting the pads for movement with six degrees of freedom.

11. The seal of claim 10, wherein the support structure comprises a plurality of beam-like support members and at least one beam support member; each beam-like support member spaced from a lift pad, a stub portion connecting said lift pad to the beam-like member and supporting said lift pad for movement with respect to the beam-like member; and a beam support member, said beam-like member supported on said beam support member for movement with respect thereto.

12. The seal of claim 11, wherein said lift pad face has a center line and said support portion supports said lift pad at a point between said center line and said trailing edge.

13. The seal of claim 7, wherein the ring has an easily moldable shape.

14. The ring of claim 7, wherein the ring support structure comprises a primary lift pad support portion, a secondary lift pad support portion and a tertiary support portion the primary support portion being divided into a plurality of beam-like lift pad supports, each of said plurality of lift pads being supported by at least one of the plurality beam-like pad support members in the primary support portion; the secondary support portion supporting each of said plurality of beam-like members and the tertiary support portion supporting the secondary support portion; the support structure designed to support the lift pads for movement with six degrees of freedom.

15. The seal of claim 7, further comprising a bottom recess formed in the support surface of each of the lift pads, the recess being spaced from the side edges and extending from the leading edge of the lift pad such that, under load, the pad deflects as to form lubricant retaining channels and to increase leading edge bending.

16. The seal of claim 7, wherein the lift pads are formed from a single member and the individual pads are defined by grooves formed in the pad surface.

17. The seal of claim 7, comprising a plurality of spaced lift pads and a support structure for supporting the lift pads, each of the lift pads having a pad surface facing the rotating shaft, a support surface facing the support structure, a leading edge, a trailing edge and two side edges, wherein the support surface of each of the lift pads is tapered toward the leading edge such that the leading edge of the lift pad is thinner than the center region of the lift pad.

18. The seal of claim 7, comprising a plurality of spaced lift pads and a support structure for supporting the lift pads, each of the lift pads having a pad surface facing the rotating shaft, a support surface facing the support structure, a leading edge, a trailing edge and two side edges, wherein a recess is formed in the support surface of each of the lift pads, the recess spaced from the side edges and extending from the leading edge of the lift pad so as to define an undercut region of the lift pad, a portion of the lift pad which is not recessed being in contact with the support structure such that under load, the undercut region of the lift pad deflects away from the shaft to be supported toward the support structure so as to define a lubricant retaining pocket and to allow lubricant to enter the leading edge.

19. The seal of claim 7, Comprising a plurality of spaced lift pads and a support structure for supporting the lift pads, each of the lift pads having a pad surface facing the rotating shaft, a support surface facing the support structure, a leading edge, a trailing edge and two side edges wherein individual pads are defined by pad defining grooves formed in the pad surface of the lift pads and extending between the side edges of the lift pads.

20. The seal of claim 7, comprising: a cylindrical body having a radially inner cylindrical surface; a radially outer cylindrical surface; and two planar faces extending between the radially inner and outer edges; plurality of circumferentially spaced radially extending axial pad defining grooves formed in the first planar face so as to define a plurality of bearing pads, each of the lift pads having a leading edge, a trailing edge and side edges defined by the radially inner and outer edges;

a plurality of bottom recesses formed in the second planar face of the cylindrical body the bottom recesses being spaced from the radially inner and outer edges and extending toward the first planar surface so as to undercut the first planar surface and the recesses being circumferentially spaced so as to undercut the leading edge portion of each of the pads defined by the pad defining grooves.

21. The seal of claim 20, wherein the recesses formed in the second planar surface have a generally horseshoe shape so as to define circumferential rail portions and a circular undercut edge.

* * * * *